(12) United States Patent
Yeon et al.

(10) Patent No.: US 9,904,306 B2
(45) Date of Patent: Feb. 27, 2018

(54) VOLTAGE CONVERTER, WIRELESS POWER RECEPTION DEVICE AND WIRELESS POWER TRANSMISSION SYSTEM INCLUDING THE SAME

(71) Applicants: Pyung-Woo Yeon, Seoul (KR);
Myeong-Lyong Ko, Seoul (KR);
Kyung-Goo Moh, Yongin-si (KR);
Sung-Woo Moon, Seongnam-si (KR);
Filippo Neri, Seongnam-si (KR)

(72) Inventors: Pyung-Woo Yeon, Seoul (KR);
Myeong-Lyong Ko, Seoul (KR);
Kyung-Goo Moh, Yongin-si (KR);
Sung-Woo Moon, Seongnam-si (KR);
Filippo Neri, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 520 days.

(21) Appl. No.: 14/540,168

(22) Filed: Nov. 13, 2014

(65) Prior Publication Data
US 2015/0130292 A1    May 14, 2015

(30) Foreign Application Priority Data
Nov. 13, 2013   (KR) .................. 10-2013-0137287

(51) Int. Cl.
*H01F 27/42* (2006.01)
*H01F 37/00* (2006.01)
(Continued)

(52) U.S. Cl.
CPC .............. *G05F 1/62* (2013.01); *B60L 11/182* (2013.01); *B60L 11/1824* (2013.01);
(Continued)

(58) Field of Classification Search
CPC ........ G05F 1/62; B60L 2240/70; H02J 7/025; H02M 1/36; H02M 2001/0045;
(Continued)

(56) References Cited

U.S. PATENT DOCUMENTS 6,097,178 A    8/2000  Owen et al.
7,982,445 B1 *  7/2011  Xin-LeBlanc ........ H02M 3/158
                                          323/282
(Continued)

FOREIGN PATENT DOCUMENTS

| JP | 11341711 | 12/1999 |
| JP | 2006074848 A | 3/2006 |
| KR | 100643941 B1 | 11/2006 |

*Primary Examiner* — Jared Fureman
*Assistant Examiner* — Esayas Yeshaw
(74) *Attorney, Agent, or Firm* — Harness, Dickey & Pierce, P.L.C.

(57) ABSTRACT

A voltage converter includes a high voltage regulator, a buck converter and a dual input linear regulator unit. The high voltage regulator converts a rectified voltage to a first load voltage. The rectified voltage is rectified from an input voltage. The buck converter generates an output voltage having a first level based on the rectified voltage during a stabilizing period and provides a transition detection signal that is enabled when the output voltage transitions to the first level. The stabilizing period is successive to an initializing period. The dual input linear regulator unit receives the first load voltage, the output voltage and a reference voltage, generates a second load voltage based on the first load voltage during the initializing period, and generates the second load voltage based on the output voltage during the stabilizing period.

19 Claims, 18 Drawing Sheets

(51) Int. Cl.
*G05F 1/62* (2006.01)
*H02J 5/00* (2016.01)
*H02J 7/02* (2016.01)
*B60L 11/18* (2006.01)
*H02M 1/36* (2007.01)
*H02M 1/00* (2006.01)

(52) U.S. Cl.
CPC ........... *B60L 11/1846* (2013.01); *H02J 5/005* (2013.01); *H02J 7/025* (2013.01); *B60L 2210/10* (2013.01); *B60L 2210/30* (2013.01); *B60L 2210/40* (2013.01); *B60L 2230/16* (2013.01); *B60L 2240/70* (2013.01); *H02M 1/36* (2013.01); *H02M 2001/0045* (2013.01); *Y02T 10/7005* (2013.01); *Y02T 10/7088* (2013.01); *Y02T 10/7216* (2013.01); *Y02T 10/7241* (2013.01); *Y02T 10/7291* (2013.01); *Y02T 90/121* (2013.01); *Y02T 90/122* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
CPC ............. Y02T 10/7088; Y02T 10/7005; Y02T 10/7241; Y02T 90/16; Y02T 10/7216; Y02T 90/163; Y02T 90/169; Y02T 10/7291; Y02T 90/121; Y02T 90/14; Y02T 90/01
See application file for complete search history.

(56) References Cited

U.S. PATENT DOCUMENTS

| | | | |
|---|---|---|---|
| 8,134,256 B2 | 3/2012 | Onishi et al. | |
| 8,160,654 B2 | 4/2012 | Onishi et al. | |
| 8,344,688 B2 | 1/2013 | Yoda et al. | |
| 8,446,046 B2 * | 5/2013 | Fells | H02J 5/005 307/104 |
| 9,437,362 B2 * | 9/2016 | Kim | H01F 38/14 |
| 2007/0030749 A1 * | 2/2007 | Pyeon | G11C 5/147 365/226 |
| 2008/0122416 A1 * | 5/2008 | Cowell | G05F 1/56 323/280 |
| 2009/0021219 A1 * | 1/2009 | Yoda | H02J 7/025 320/137 |
| 2009/0322295 A1 * | 12/2009 | Scoones | G05F 1/56 323/282 |
| 2010/0060078 A1 | 3/2010 | Shaw | |
| 2012/0086281 A1 * | 4/2012 | Kanno | H02J 5/005 307/82 |
| 2012/0306284 A1 | 12/2012 | Lee et al. | |
| 2013/0099588 A1 | 4/2013 | Yeo et al. | |
| 2013/0147427 A1 * | 6/2013 | Polu | H03F 1/56 320/108 |
| 2013/0187623 A1 * | 7/2013 | Harel | G05F 1/44 323/271 |
| 2013/0342161 A1 * | 12/2013 | Byun | H02J 5/005 320/108 |
| 2014/0159508 A1 * | 6/2014 | Sankar | H02J 17/00 307/149 |
| 2014/0197785 A1 * | 7/2014 | Lee | H02J 7/025 320/108 |

* cited by examiner

→ INPUT CURRENT
---▶ INDUCED CURRENT

VOLTAGE CONVERTER, WIRELESS POWER RECEPTION DEVICE AND WIRELESS POWER TRANSMISSION SYSTEM INCLUDING THE SAME

CROSS-REFERENCE TO RELATED APPLICATION

This application claims priority under 35 USC § 119 to Korean Patent Application No. 10-2013-0137287, filed on Nov. 13, 2013 in the Korean Intellectual Property Office (KIPO), the content of which is herein incorporated by reference in its entirety.

BACKGROUND

1. Technical Field

At least one example embodiment relates generally to wireless charging, and more particularly to a voltage converter, a wireless power reception device and/or a wireless power transmission system including the same.

2. Description of the Related Art

Recently, wireless charging (non-contact) technology has been developed and used for electronic devices and applied to various electronic devices. Wireless charging technology employs wireless power transmission/reception, and includes a system in which a battery (e.g., a mobile phone battery) is automatically charged if the battery is laid on a charging pad. The battery is charged without the need to connect the mobile phone to a separate charging connector. In addition to mobile phones, wireless charging is also being used for items such as a wireless electric toothbrush or a wireless electric shaver. Accordingly, a waterproof function of these products is improved, and the portability of electronic devices is increased since there is no need to provide a wired charging apparatus. Wireless charging is expected to have an impact on the electric car market.

Wireless charging technology designs include electromagnetic induction schemes using a coil, resonance schemes using resonance, and RF/microwave radiation schemes converting electrical energy to microwave energy and then transmitting the microwave energy.

SUMMARY

At least one example embodiment provides a voltage converter capable of reducing power consumption.

At least one example embodiment provides a wireless power reception device capable of reducing power consumption.

At least one example embodiment provides a wireless power transmission system capable of reducing power consumption.

According to at least one example embodiment, a voltage converter includes a high voltage regulator, a buck converter and a dual input linear regulator unit. The high voltage regulator converts a rectified voltage to a first load voltage and the rectified voltage is rectified from an input voltage. The buck converter generates an output voltage having a first level based on the rectified voltage during a stabilizing period and provides a transition detection signal that is enabled when the output voltage transitions to the first level. The stabilizing period is successive to an initializing period. The dual input linear regulator unit receives the first load voltage, the output voltage and a reference voltage, generates a second load voltage based on the first load voltage during the initializing period and generates the second load voltage based on the output voltage during the stabilizing period.

In at least one example embodiment, the first load voltage may have the first level.

In at least one example embodiment, a power transformation efficiency of the buck converter may be higher than a power transformation efficiency of the high voltage regulator.

In at least one example embodiment, the dual input linear regulator unit may include a switching unit that selects one of the first load voltage and the output voltage in response to the transition detection signal; and a first linear regulator connected to the switching unit, which converts the first load voltage to the second load voltage during the initializing period and converts the output voltage to the second load voltage during the stabilizing period.

The switching unit may include first p-channel metal-oxide semiconductor (PMOS) transistor that is turned on based on the transition detection signal which is disabled during the initializing period to provide the first load voltage to the first linear regulator; and a second PMOS transistor that is turned on based on the transition detection signal which is enabled during the stabilizing period to provide the output voltage to the first linear regulator. The second PMOS transistor is connected to the first PMOS transistor at a first node.

The first linear regulator may include a driving unit connected to the first node, which drives a voltage at the first node according to voltage difference between the reference voltage and a feedback voltage; and a feedback unit connected to the driving unit at a second node, which divides the second load voltage at the second node to provide the feedback voltage.

The driving unit may include a comparator that receives the reference voltage and the feedback voltage; and a third PMOS transistor which has a gate receiving an output of the comparator, a source connected to the first node, and a drain connected to the second node.

The feedback unit may include first and second resistors and the first and second resistors are connected in series at a third node between the second node and a ground voltage, and the feedback voltage is provided at the third node.

The voltage converter may further include a second linear regulator, connected to the switching unit, which converts the first load voltage to a third load voltage during the initializing period and configured to convert the output voltage to the third voltage during the stabilizing period, based on the reference voltage.

The second load voltage has a second level lower than the first level, the third load voltage has a third level lower than the second level and the third level is higher than a ground voltage.

In at least one example embodiment, the dual input linear regulator unit may include a first converting unit that converts the first load voltage to the second load voltage in response to first and second enable signals during the initializing period; a second converting unit that converts the output voltage to the second load voltage in response to third and fourth enable signals during the stabilizing period; and a control logic that generates the first through fourth enable signals in response to the transition detection signal.

The first converting unit include a plurality of first PMOS transistors which are connected in parallel between first and second node, and the first PMOS transistors are sequentially turned-off in response to the first and second enable signals when an operation period transitions from the initializing period to the stabilizing period. The first load voltage is applied to the first node, the second load voltage is provided at the second node.

The first converting unit may further include a comparator that compares a feedback voltage with the reference voltage, the feedback voltage corresponding to a voltage that the second load voltage is divided; a first switching unit that includes a plurality of first switches, each of the first switches connected to an output of the comparator and each gate of the first PMOS transistors, the first switches being switched in response to the first enable signals; and a second switching unit that includes a plurality of second switches, each of the second switches connected to the first load voltage, an output of the first switching unit and each gate of the first PMOS transistors, the second switches being switched in response to the second enable signals.

The second converting unit may include a plurality of second PMOS transistors which are connected in parallel between third and the second nodes, and the second PMOS transistors are sequentially turned-off in response to the third and fourth enable signals when the operation period transitions from the initializing period to the stabilizing period. The output voltage is applied to the third node.

The second converting may further include a comparator that compares a feedback voltage with the reference voltage, the feedback voltage corresponding to a voltage that the second load voltage is divided; a first switching unit that includes a plurality of first switches, each of the first switches connected to an output of the comparator and each gate of the second PMOS transistors, the first switches being switched in response to the third enable signals; and a second switching unit that includes a plurality of second switches, each of the second switches connected to output voltage, an output of the first switching unit and each gate of the second PMOS transistors, the second switches being switched in response to the fourth enable signals.

In at least one example embodiment, the buck converter may include a low-pass filter that filters the rectified voltage to provide the output voltage.

According to at least one example embodiment, a wireless power reception device includes a rectifier and a voltage converter. The rectifier rectifies an input voltage to provide a rectified voltage, and the input voltage is generated based on an energy in a target resonator through a magnetic resonance from a source resonator. The voltage converter converts the rectified voltage to a first load voltage with a first power transformation efficiency during an initializing period and is configured to convert the rectified voltage to at least a second load voltage with a second power transformation efficiency higher than the first power transformation efficiency during a stabilizing period which is successive to an initializing period.

In at least one example embodiment, the voltage converter may include a high voltage regulator that converts the rectified voltage to the first load voltage; a buck converter that generates an output voltage having a first level based on the rectified voltage during the stabilizing period and provides a transition detection signal that is enabled when the output voltage transitions to the first level; and a dual input linear regulator unit that receives the first load voltage, the output voltage and a reference voltage, generates at least the second load voltage based on the first load voltage during the initializing period and generates at least the second load voltage based on the output voltage during the stabilizing period.

In at least one example embodiment, the dual input linear regulator unit may include a switching unit that selects one of the first load voltage and the output voltage in response to the transition detection signal; and a first linear regulator connected to the switching unit, which converts the first load voltage to the second load voltage during the initializing period and converts the output voltage to the second load voltage during the stabilizing period.

In at least one example embodiment, the dual input linear regulator unit may include a first converting unit that converts the first load voltage to the second load voltage in response to first and second enable signals during the initializing period; a second converting unit that converts the output voltage to the second load voltage in response to third and fourth enable signals during the stabilizing period; and a control logic that generates the first through fourth enable signals in response to the transition detection signal.

In at least one example embodiment, the buck converter may include a first n-channel metal-oxide semiconductor (NMOS) transistor which is connected between the rectified voltage and a first node; a second NMOS transistor which are connected between the first node and a ground voltage; a first gate driver that drives the first NMOS transistor based on a difference between a saw-tooth wave and a second error voltage; a second gate driver that drives the second NMOS transistor based on the difference between the saw-tooth wave and the second error voltage; a low-pass filter, connected between the first node and a second node, which includes an inductor and a capacitor, the output voltage being provided at the second node; a first error amplifier that compares a feedback voltage and a band-gap reference voltage to provide a first error voltage, the output voltage being divided into the feedback voltage; a second error amplifier that compares the first error voltage and a voltage converted from a current flowing in the inductor to provide the second error voltage; and a pulse-width modulation (PWM) comparator that compares the saw-tooth wave and the second error voltage to provide an output to the first and second gate drivers.

In at least one example embodiment, the wireless power reception device may further include charger that charges a battery using the second load voltage during stabilizing period.

According to at least one example embodiment, a wireless power transmission system includes a wireless power transmission device and a wireless power reception device. The wireless power transmission device includes a source resonator, and the wireless power transmission device transfers electromagnetic energy to a target resonator through the source resonator. The wireless power reception device receives the electromagnetic energy using magnetic resonance through the target resonator. The wireless power reception device includes a rectifier and a voltage converter. The rectifier rectifies an input voltage to provide a rectified voltage, and the input voltage is generated based on the received electromagnetic energy. The voltage converter converts the rectified voltage to a first load voltage with a first power transformation efficiency during an initializing period and configured to convert the rectified voltage to at least a second load voltage with a second power transformation efficiency higher than the first power transformation efficiency during a stabilizing period which is successive to an initializing period.

In at least one example embodiment, the voltage converter may include a high voltage regulator that converts the rectified voltage to the first load voltage; a buck converter that generates an output voltage having a first level based on the rectified voltage during the stabilizing period and provides a transition detection signal that is enabled when the output voltage transitions to the first level; and a dual input linear regulator unit that receives the first load voltage, the output voltage and a reference voltage, generates at least the second load voltage based on the first load voltage during the initializing period and generates at least the second load voltage based on the output voltage during the stabilizing period.

According to at least one example embodiment, a conversion device of a target device for receiving wireless power from a source device includes a first voltage regulator configured to output a first voltage based on a rectified voltage and a reference voltage. The first voltage may have a first power conversion efficiency with respect to the rectified voltage. The conversion device may include a voltage converter configured to generate a control signal and a second voltage. The second voltage may be based on the first voltage and the rectified voltage. The second voltage may have a second power conversion efficiency with respect to the rectified voltage. The second power conversion efficiency may be higher than the first power conversion efficiency. The conversion device may include a second voltage regulator configured to output at least a third voltage based on one of the first voltage and the second voltage according to the control signal. The control signal may indicate an operation mode of the target device.

According to at least one example embodiment, the conversion device includes a target resonator configured to receive electromagnetic energy from a source resonator of the source device. The rectified voltage may be based on the received electromagnetic energy.

According to at least one example embodiment, the second voltage regulator is configured to output a fourth voltage based on one of the first voltage and the second voltage according to the control signal.

According to at least one example embodiment, the first voltage is greater than the third voltage, and the third voltage is greater than the fourth voltage.

In view of the above, it may be said that a voltage converter in a wireless power reception device generates a second voltage used in digital blocks based on a first load voltage output from a high voltage regulator during an initializing period, and generates the second load voltage used in a charger and digital blocks based on output voltage from the buck converter whose power transformation efficiency is higher than that of the high voltage regulator during a stabilizing period successive to the initializing period, and thus may reduce power consumption wireless power reception device.

BRIEF DESCRIPTION OF THE DRAWINGS

Features will become apparent to those of ordinary skill in the art by describing in detail exemplary embodiments with reference to the attached drawings in which.

DETAILED DESCRIPTION OF EXAMPLE EMBODIMENTS

Figure 1:
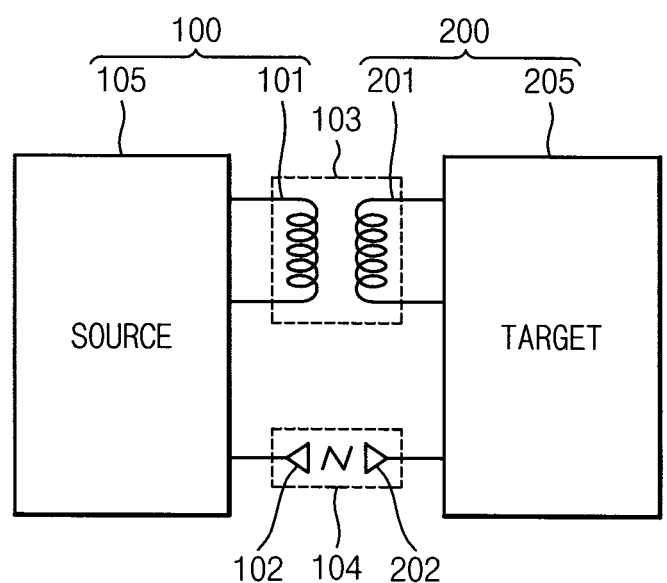
FIG. 1 is a block diagram illustrating a wireless power transmission system according to at least one example embodiment.

Various exemplary embodiments will be described more fully with reference to the accompanying drawings, in which example embodiments are shown. These inventive concepts may, however, be embodied in many different forms and should not be construed as limited to the example embodiments set forth herein. Rather, these example embodiments are provided so that this disclosure will be thorough and complete, and will fully convey the scope of the inventive concepts to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the inventive concepts. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments and is not intended to be limiting of the inventive concepts. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other.

Unless otherwise defined, all terms (including technical and scientific terms) used herein have the same meaning as commonly understood by one of ordinary skill in the art to which these inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, according to exemplary embodiments will be described in detail with reference to accompanying drawings. The same reference numerals will be assigned to the same elements, and the details thereof will be omitted in order to avoid redundancy.

A wireless power refers to energy transferred from a wireless power transmission apparatus to a wireless power reception apparatus, via magnetic coupling. A method of transmitting a wireless power has been provided for a number of products, ranging from an electric vehicle transmitting a power greater than or equal to a few kilowatts (kW), to a high power application consuming a power greater than or equal to 100 W and a low power application consuming a power less than or equal to 10 W. The low power application may be used for, e.g., a mobile device.

A wireless power reception apparatus may charge a battery using a received energy. A wireless power transmission and charging system includes a source device and a target device. The source device wirelessly transmits a power. On the other hand, the target device wirelessly receives a power. In other words, the source device may be referred to as a wireless power transmission apparatus, and the target device may be referred to as a wireless power reception apparatus.

In an example, resonance-type wireless power transmission may provide a high degree of freedom, in terms of positions of a source device and a target device. The source device includes a source resonator, and the target device includes a target resonator. Magnetic coupling or resonance coupling may be formed between the source resonator and the target resonator. The source device and the target device may communicate with each other. During communications, the transmission or reception of control and state information may occur.

FIG. 1 is a block diagram illustrating a wireless power transmission system according to at least one example embodiment.

Referring to FIG. 1, a wireless power transmission system 10 includes a source device (or a wireless power transmission device) 100 and a target device (or, a wireless power reception device) 200. The source device 100 may be any of various devices that supply power, such as pads, terminals, televisions (TVs), and any other device that supplies power. The target device 200 may be any of various devices that consume power, such as terminals, TVs, vehicles, washing machines, radios, lighting systems, and any other device that consumes power.

The source device 100 may include a source 105, a source resonator 101 and an antenna 102, and the target device 200 may include a target 205, a target resonator 201 and an antenna 202.

The source resonator 101 may transmit electromagnetic energy 103 to the target resonator 201. For example, the source resonator 101 may transfer the electromagnetic energy 103 such as communication power and/or a charging power to the target resonator 201 via a magnetic coupling (or a magnetic resonance) with the target resonator 201. The communication power may be, for example, a relatively low power of 0.1 to 1 milliwatts (mW). The charging power may be, for example, a relatively high power of 1 mW to 200 Watts (W) that may be consumed by a device load of the target device 200. In this description, the term "charging" may refer to supplying power to an element or a unit that charges a battery or other rechargeable device with power. Also, the term "charging" may refer supplying power to an element or a unit that consumes power. For example, the term "charging power" may refer to power consumed by a target device while operating, or power used to charge a battery of the target device. The unit or the element may include, for example, a battery, a display device, a sound output circuit, a main processor, and various types of sensors. The high power of 1 mW to 200 Watts (W) may be used for operating and charging an electric vehicle and/or a mobile terminal.

The source 105 may provide the target 205 with various data 104 via the antenna 102, and the target 205 may receive the various data 104 via the antenna 202 from the target 105. The source 105 and the target 205 may perform out-of-band communication using the antennas 102 and 202.

Figure 2:
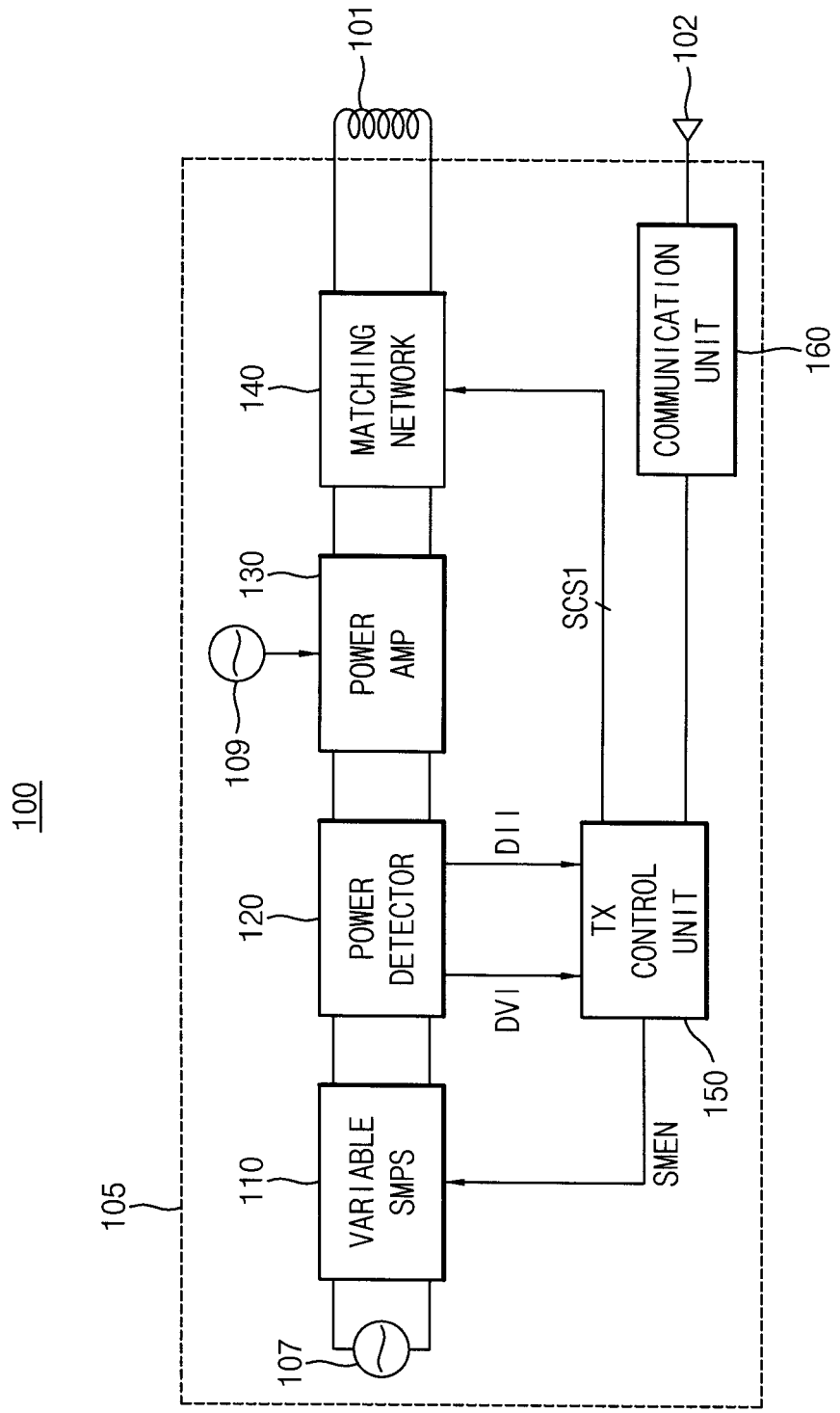
FIG. 2 is a block diagram illustrating the source device in FIG. 1 according to at least one example embodiment.

FIG. 2 is a block diagram illustrating the source device in FIG. 1 according to at least one example embodiment.

Referring to FIG. 2, the source device 100 include the source resonator 101, the antenna 102 and the source 105. The source 105 includes a variable switching mode power supply (SMPS) 110, a power detector 120, a power amplifier 130, a matching network 140, a transmission (TX) control unit 150, and a communication unit 160.

The variable SMPS 110 generates a direct current (DC) voltage by switching an alternating current (AC) voltage having a frequency of tens of hertz (Hz) (e.g., 60 Hz) output from a power supply 107. The variable SMPS 110 may output a DC voltage having a desired (or alternatively, predetermined) level, or may output a DC voltage having an adjustable level according to control signal SMEN from the TX control unit 150.

The power detector 120 detects an output current and an output voltage of the variable SMPS 110, and provides, to the TX control unit 150, information DVI and DII on the detected current and the detected voltage. Additionally, the power detector 120 detects an input current and an input voltage of the power amplifier 130.

The power amplifier 130 generates a power by converting the DC voltage output from the variable SMPS 110 to an AC voltage using a switching pulse signal having a frequency of a few kilohertz (kHz) to tens of megahertz (MHz) from an oscillator 109. In other words, the power amplifier 120 converts a DC voltage supplied to the power amplifier 120 to an AC voltage using a reference resonance frequency, and generates a communication power to be used for communication, or a charging power to be used for charging that may be used in the target device.

The TX control unit 150 may detect a reflected wave of the communication power or a reflected wave of the charging power through the communication unit 160, and may detect mismatching between the target resonator 201 and the source resonator 101 based on the detected reflected wave. The TX control unit 150 may detect the mismatching by detecting an envelope of the reflected wave, or by detecting an amount of a power of the reflected wave.

Under the control of the TX control unit 150, the matching network 140 compensates for impedance mismatching between the source resonator 101 and the target resonator 201 so that the source resonator 101 and the target resonator 201 are optimally-matched. The matching network 140 may include combinations of capacitors and inductors that are connected to the TX control unit 150 through one or more switches that switch in response to switching control signals SCS1 from the TX control unit 150.

The TX control unit 150 may calculate a voltage standing wave ratio (VSWR) based on a voltage level of the reflected wave and a level of an output voltage of the source resonator 101 or the power amplifier 130. When the VSWR is greater than a desired (or alternatively, predetermined) value, the TX control unit 150 detects the mismatching. The value may be user defined or determined based on empirical data.

In addition, the TX control unit 150 calculates a power transmission efficiency of each of N desired (or alternatively, predetermined) tracking frequencies. From this, the TX control unit 150 determines a tracking frequency having a desired (or alternatively, maximum) power transmission efficiency among the N tracking frequencies, and changes the reference resonance frequency to the tracking frequency.

In addition, the TX control unit 150 may control a frequency of the switching pulse signal used by the power amplifier 130. By controlling the switching pulse signal used by the power amplifier 130, the TX control unit 150 may generate a modulation signal to be transmitted to the target device 200. For example, the communication unit 160 may transmit various messages to the target device 200 via in-band communication. Additionally, the TX control unit 150 may detect a reflected wave, and may demodulate a signal received from the target device 200 through an envelope of the reflected wave.

The TX control unit 150 may generate a modulation signal for in-band communication using various schemes. For generating a modulation signal, the TX control unit 150 may turn on or off the switching pulse signal used by the power amplifier 130, or may perform delta-sigma modulation. Additionally, the TX control unit 150 may generate a pulse-width modulation (PWM) signal having a desired (or alternatively, predetermined) envelope.

The communication unit 160 may perform out-of-band communication using a communication channel. The communication unit 160 may include a communication module, such as a ZigBee module, a Bluetooth module, or any other communication module that the communication unit 160 may use to perform the out-of-band communication. The communication unit 160 may transmit or receive data 104 to or from the target device 200 via the out-of-band communication.

Figure 3:
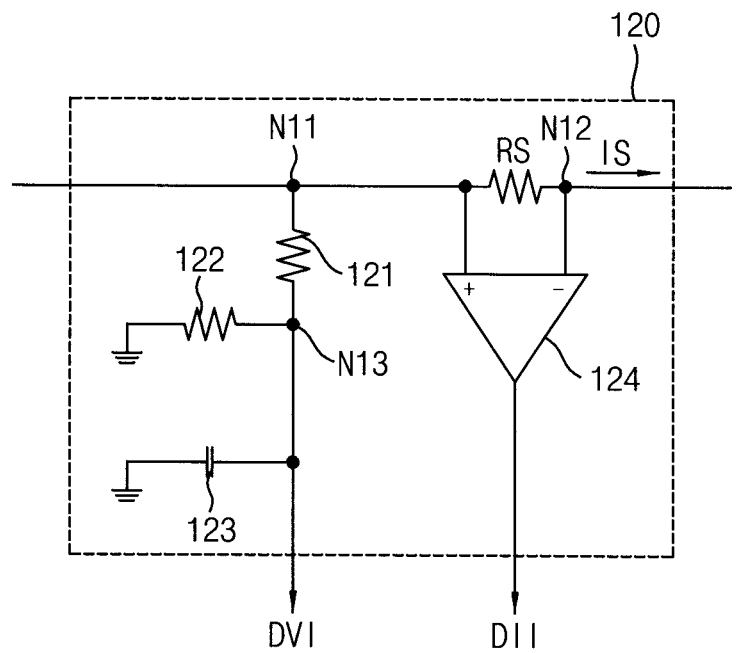
FIG. 3 illustrates an example of the power detector in FIG. 2.

FIG. 3 illustrates an example of the power detector in FIG. 2.

Referring to FIG. 3, the power detector 120 includes a resistor 121 connected between nodes N11 and N13, a resistor 122 connected between the node N31 and a ground voltage, and a capacitor 123 connected between the node N13 and the ground voltage. The power detector 120 may further include a resistor RS connected between the node N11 and a node N12 and a comparator 124.

Voltage at the node N13 may be provided to the TX control unit 150 as the detected voltage information DVI. The comparator 124 detects a voltage difference between voltages at the nodes N11 and N12 which are generated by a current IS flowing through the resistor RS. An output of the comparator 142 may be provided to the TX control unit 150 as the detected current information DII.

Figure 4:
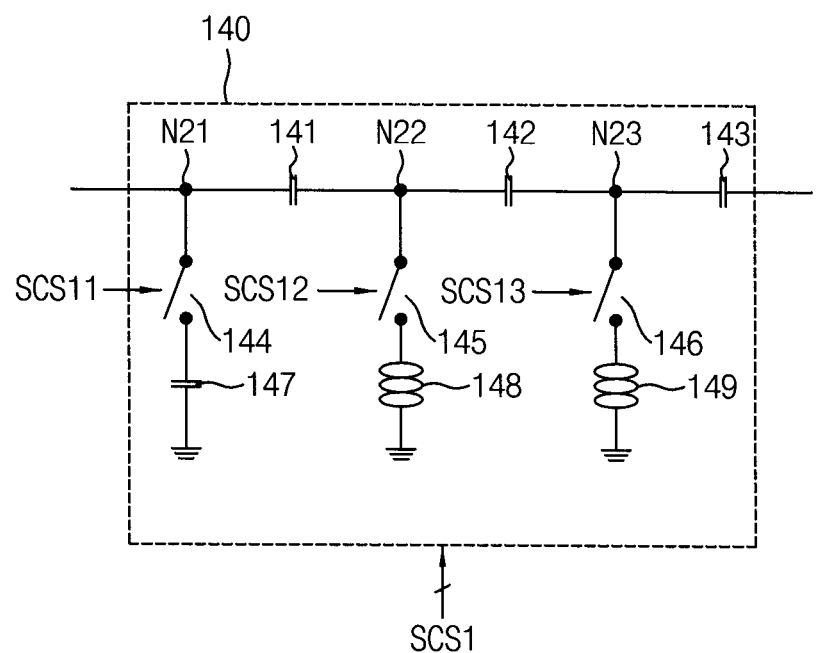
FIG. 4 illustrates an example of the matching network in FIG. 2 according to at least one example embodiment.

FIG. 4 illustrates an example of the matching network in FIG. 2 according to at least one example embodiment.

Referring to FIG. 4, the matching network 140 includes a plurality of capacitors 141, 142, 143 and 147, a plurality of switches 144, 145 and 146 and a plurality of inductors 148 and 149.

The capacitor 141 is connected between nodes N21 and N22, the capacitor 142 is connected between nodes N22 and N23, and the capacitor 143 is connected between the node 143 and the source resonator 101. The switch 144 and the capacitor 147 are connected in series between the node N21 and the ground voltage, the switch 145 and the inductor 148 are connected in series between the node N22 and the ground voltage, and the switch 146 and the inductor 149 are connected in series between the node N23 and the ground voltage. Each of the switches 144-146 is switched in response to each of the switching control signals SCS11, SCS12 and SCS13 to compensate for impedance mismatching between the source resonator 101 and the target resonator 201 so that the source resonator 101 and the target resonator 201 are matched (e.g., optimally matched).

Referring again to FIG. 1, the source resonator 101 transfers the electromagnetic energy 103 to the target resonator 201. For example, the source resonator 101 may transfer the electromagnetic energy 103 such as communication power or a charging power to the target resonator 201 via a magnetic coupling (or a magnetic resonance) with the target resonator 201.

Figure 5:
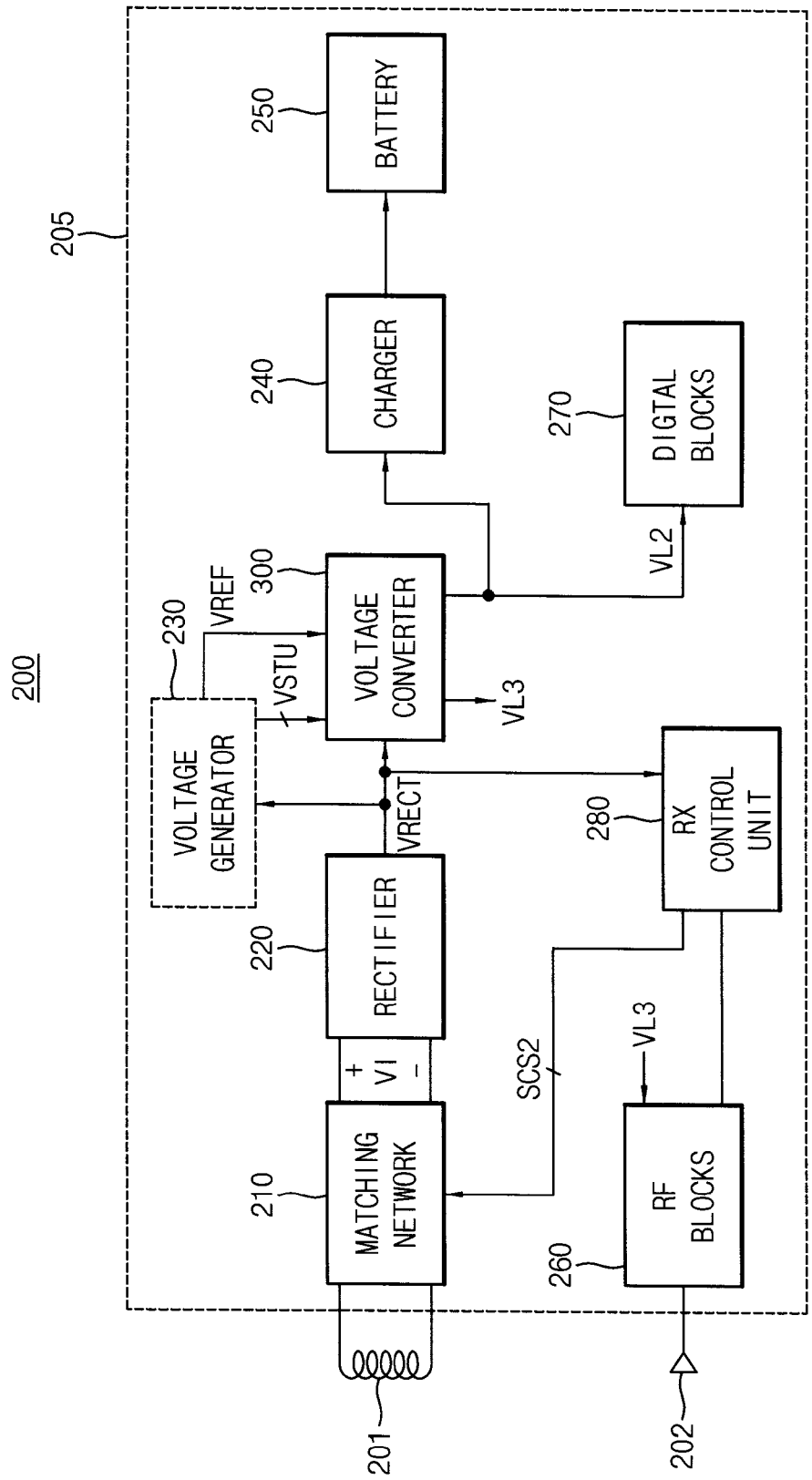
FIG. 5 is a block diagram illustrating the target device in FIG. 1 according to at least one example embodiment.

FIG. 5 is a block diagram illustrating the target device in FIG. 1 according to at least one example embodiment.

Referring to FIG. 5, the target device (or the wireless power reception device) 200 includes the target resonator 201, the antenna 202 and the target 205. The target 205 includes a matching network 210, a rectifier 220, a voltage converter 300, a charger 240, a battery 250, radio frequency (RF) blocks 260, digital blocks 270, and a reception (RX) control unit 280. The target 205 may further include a voltage generator 230.

The target resonator 201 receives the electromagnetic energy 103, such as the communication power or the charging power, from the source resonator 101 via a magnetic coupling with the source resonator 101. Additionally, the target resonator 201 receives various messages 104 from the source 105 via the in-band communication.

The target resonator 201 receives the electromagnetic energy 103 through the magnetic resonance from the source resonator 101 to provide the energy to the matching network 210. Under the control of the switching control signals SCS2 from the RX control unit 280, the matching network 210 compensates for impedance mismatching between the source resonator 101 and the target resonator 201, and provides the rectifier 220 with an input voltage VI based on the received energy. The matching network 140 includes combinations of capacitors and inductors as illustrated in FIG. 4.

The rectifier 220 rectifies the input voltage VI to provide a rectified voltage VRECT to the voltage generator 230 and the voltage converter 300. The voltage generator 230 generates a plurality of start-up voltages VSTU and a reference voltage VREF based on the rectified voltage VRECT to provide the start-up voltages VSTU and the reference voltage VREF to the voltage converter 300.

The voltage converter 300 receives the rectified voltage VRECT, the start-up voltages VSTU, and the reference voltage VREF, and converts the rectified voltage VRECT to a first load voltage VL1. Although not explicitly shown in FIG. 5, the first load voltage VL1 is described further with reference to FIG. 8. The voltage converter 300 generates second and third load voltages VL2 and VL3 based on the first load voltage VL1 during an initializing period to provide the second and third load voltages VL2 and VL3 to the digital blocks 270 and the RF blocks 260, respectively, as a charging voltage. In addition, the voltage converter 300 generates an output voltage having a first level, and generates the second and third load voltages VL2 and VL3 based on the output voltage during a stabilizing period successive to the initializing period to provide the second and third load voltages VL2 and VL3 to the digital blocks 270 and the RF blocks 260, respectively, as a charging voltage.

The initializing period may be a period when the target device 200 starts to operate. For example, during the initializing period, the RF blocks 260 of the target device 200 may be exchanging information with the communication unit 160 of the source device 100. The stabilizing period may be a period when the target device 200 operates stably after a certain time from the initializing period. For example, during the stabilizing period, the battery 250 of the target device 200 may charge through the charger 240. Durations of the initializing period and the stabilizing period may be user defined and/or based on empirical data. The first load voltage VL1 has the first level, the second load voltage VL2 has a second level lower than the first level, and the third load voltage VL3 has a third level which is lower than the second level and higher than the ground voltage. The rectified voltage VRECT may have a level between the first level and a fourth level higher than the first level.

The voltage converter 300 provides the second load voltage VL2 to the charger 240 during the stabilizing period and the charger 240 charges the battery 250 based on the second load voltage VL2.

The RF blocks (or communication unit) 260 may perform in-band communication to transmit and receive data using resonance frequency. The RX control unit 280 demodulates a received signal by detecting a signal between the target resonator 201 and the rectifier 220, or based on the rectified voltage VRECT. In other words, the RX control unit 280 may demodulate a message received via the in-band communication. Additionally, the RX control unit 280 may adjust an impedance of the target resonator 201 to modulate a signal to be transmitted to the source device 100.

The RF blocks 260 may transmit, to the source device 100, any one or any combination of a response message including a product type of a corresponding target device, manufacturer information of the corresponding target device, a product model name of the corresponding target device, a battery type of the corresponding target device, a charging scheme of the corresponding target device, an impedance value of a load of the corresponding target device, information about a characteristic of a target resonator of the corresponding target device, information about a frequency band used the corresponding target device, an amount of power to be used by the corresponding target device, an intrinsic identifier of the corresponding target device, product version information of the corresponding target device, and standards information of the corresponding target device.

The RF blocks 260 may also perform an out-of-band communication using a communication channel. The RF blocks 260 may include a communication module, such as a ZigBee module, a Bluetooth module, or any other communication module known in the art that the RF blocks 260 may use to transmit or receive data 104 to or from the source device 100 via the out-of-band communication.

The TX control unit 150 in FIG. 2 sets a resonance bandwidth of the source resonator 101. Based on the resonance bandwidth of the source resonator 101, the TX control unit 150 sets a Q-factor of the source resonator 101. Similarly, the RX control unit 280 in FIG. 5 sets a resonance bandwidth of the target resonator 201. Based on the resonance bandwidth of the target resonator 201, the RX control unit 201 sets a Q-factor of the target resonator 201. For example, the resonance bandwidth of the source resonator 101 may be set to be wider or narrower than the resonance bandwidth of the target resonator 201.

Figure 6:
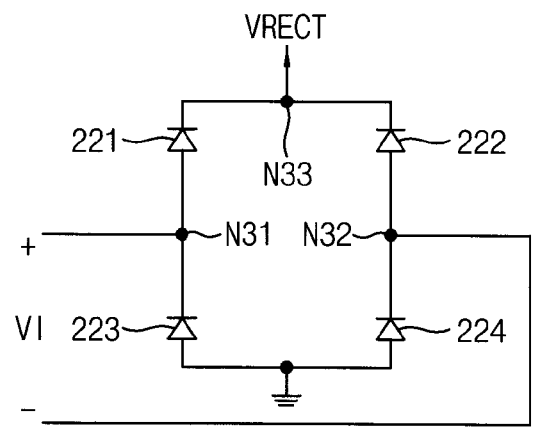
FIG. 6 is a circuit diagram illustrating the rectifier in FIG. 5 according to at least one example embodiment.

FIG. 6 is a circuit diagram illustrating the rectifier in FIG. 5 according to at least one example embodiment.

Referring to FIG. 6, the rectifier 200 includes a plurality of diodes 221-224.

The diode 221 is connected to the diode 223 at a node N31 and is connected to the diode 222 at a node N33. The diode 224 is connected to the diode 222 at a node N32 and the diodes 223 and 224 are commonly connected to the ground voltage. The input voltage VI is applied to the nodes N31 and N32, and the rectified voltage VRECT is provided at the node N33. The rectifier 220 rectifies the input voltage VI which is AC voltage to provide the rectified voltage VRECT which is DC voltage. The nodes N31 and N32 are connected to the matching network 210.

Figure 7:
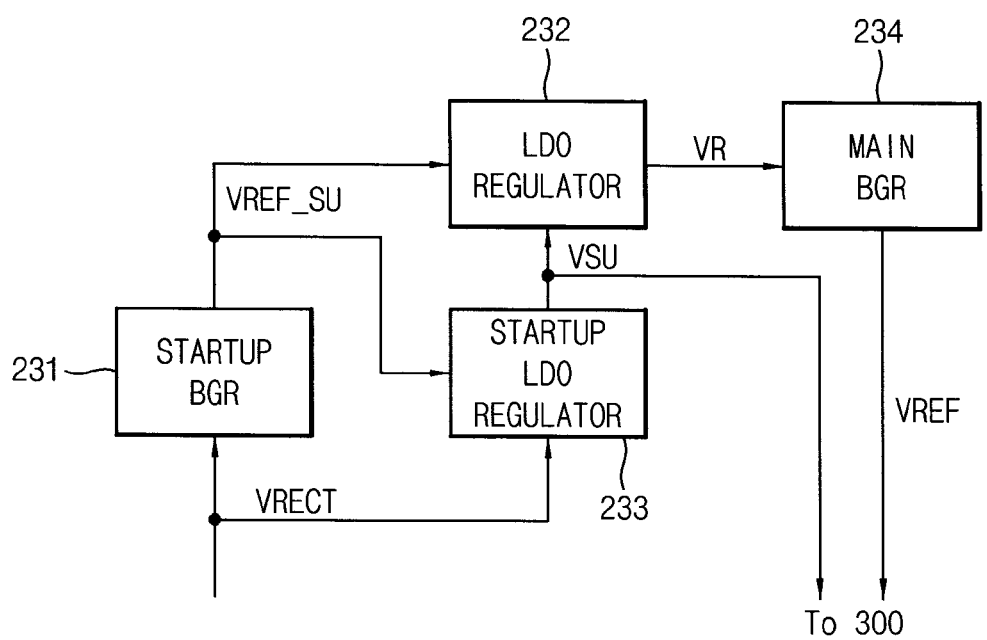
FIG. 7 is a block diagram illustrating the voltage generator in FIG. 5 according to at least one example embodiment.

FIG. 7 is a block diagram illustrating the voltage generator in FIG. 5 according to at least one example embodiment.

Referring to FIG. 7, the voltage generator 230 includes a start-up band-gap voltage generator 231, a low drop-out (LDO) regulator 232, a start-up LDO regulator 233 and a main band-gap voltage generator 234.

The start-up band-gap voltage generator 231 generates a first start-up voltage VREF_SU based on the rectified voltage VRECT. That is, the start-up band-gap voltage generator 231 may generate the first start-up voltage VREF_SU to transition to a high level in response to the rectified voltage VRECT transitioning to a high level.

The LDO regulator 232 generates a regulated voltage VR having a regulated level based on the first start-up voltage VREF_SU to provide the regulated voltage VR to the main band-gap voltage generator 234. The start-up LDO regulator 233 generates a second start-up voltage VSU based on the rectified voltage VRECT and the first start-up voltage VREF_SU. That is, the start-up LDO regulator 233 may generate the second start-up voltage VSU to transition to a high level in response to the first start-up voltage VREF_SU transitioning to a high level.

The main band-gap voltage generator 234 generates the reference voltage VREF based on the regulated voltage VR to provide the reference voltage VREF to the voltage converter 300.

The rectified voltage VRECT may have a level of 5V-20V according to a distance from the source device 100, the first start-up voltage VREF_SU may have a level of about 1.2V, the second start-up voltage VSU may have a level of about 5V and the reference voltage VREF may have a level of about 1.2V.

Figure 8:
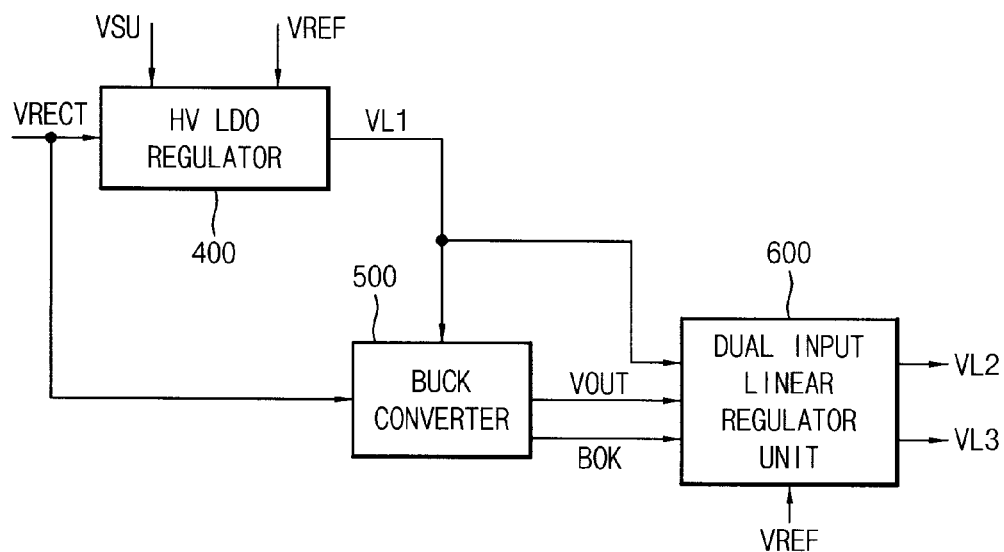
FIG. 8 is a block diagram illustrating the voltage converter in FIG. 5 according to at least one example embodiment.

FIG. 8 is a block diagram illustrating the voltage converter in FIG. 5 according to at least one example embodiment.

Referring to FIG. 8, the voltage converter 300 includes a high voltage regulator 400, a buck converter 500 and a dual input linear regulator unit 600.

The high voltage regulator 400 receives the reference voltage VREF and the second start-up voltage VSU and converts the rectified voltage VRECT to the first load voltage VL1 having a first level. The high voltage regulator 400 provides the first load voltage VL1 to the buck converter 500 and the dual input linear regulator unit 600.

The buck converter 500 receives the rectified voltage VRECT and the first load voltage VL1, generates an output voltage VOUT having a first level during a stabilizing period successive to an initializing period, and generates a transition detection signal BOK that is enabled when the output voltage VOUT transitions to the first level. The initializing period may be when the target device 200 starts to operate. The stabilizing period may be when the target device 200 stably operates after a certain time from the initializing period. The buck converter 500 provides the dual input linear regulator unit 600 with the output voltage VOUT and the transition detection signal BOK. The transition detection signal BOK is a signal that is enabled when the buck converter 500 starts to provide the output voltage VOUT having the first level. That is, the transition detection signal BOK indicates normal operation of the buck converter 500. A power transformation efficiency (or power conversion efficiency) of the buck converter 500 is higher than a power transformation efficiency (or power conversion efficiency) of the high voltage regulator 400.

The dual input linear regulator unit 600 receives the first load voltage VL1, the output voltage VOUT, and the transition detection signal BOK. The dual input regulator unit 600 generates the second load voltage VL2 having a second level based on the first load voltage VL1 during the initializing period. The dual input regulator unit 600 generates the second load voltage VL2 based on the output voltage VOUT during the stabilizing period, which is successive to the initializing period. In addition, the dual input linear regulator unit 600 may generate the third load voltage having a third level based on the first load voltage VL1 during the initializing period, and generate the third load voltage VL3 based on the output voltage VOUT during the stabilizing period successive to the initializing period. According to at least one example embodiment, the second level is lower than the first level and the third level is lower than the second level and higher than the ground voltage.

The dual input linear regulator unit 600 in the voltage converter 300 generates the second and third load voltages VL2 and VL3 using the first load voltage VL1 output from the high voltage regulator 400 during the initializing period when the target device 200 starts to operate. The dual input linear regulator unit 600 provides the second and third load voltages VL2 and VL3 to the digital blocks 270 and the RF blocks 280, respectively (see FIG. 5). In addition, the dual input linear regulator unit 600 generates the second and third load voltages VL2 and VL3 using the output voltage VOUT output from the buck converter 500 during the stabilizing period when the target device 200 stably operates after a certain time from the initializing period The dual input linear regulator unit 600 provides the second and third load voltages VL2 and VL3 to the digital blocks 270 and the RF blocks 280, respectively.

Therefore, since the dual input linear regulator unit 600 generates the second and third load voltages VL2 and VL3 using the first load voltage VL1 during the initializing period of the target device 200 and generates the second and third load voltages VL2 and VL3 using the output voltage VOUT during the stabilizing period, and since the buck converter 500 has a power transformation efficiency higher than the high voltage regulator 400, the voltage converter 300 may reduce power consumption and may increase power transformation efficiency of the target device 200.

The high voltage regulator 400 is sensitive to noise caused by a switching frequency of the buck converter 500. However, the effect the noise on the quality of DC voltages provided to the digital blocks 270 and the RF blocks 280 is mitigated due to the above described method of operating the voltage converter 300.

Figure 9:
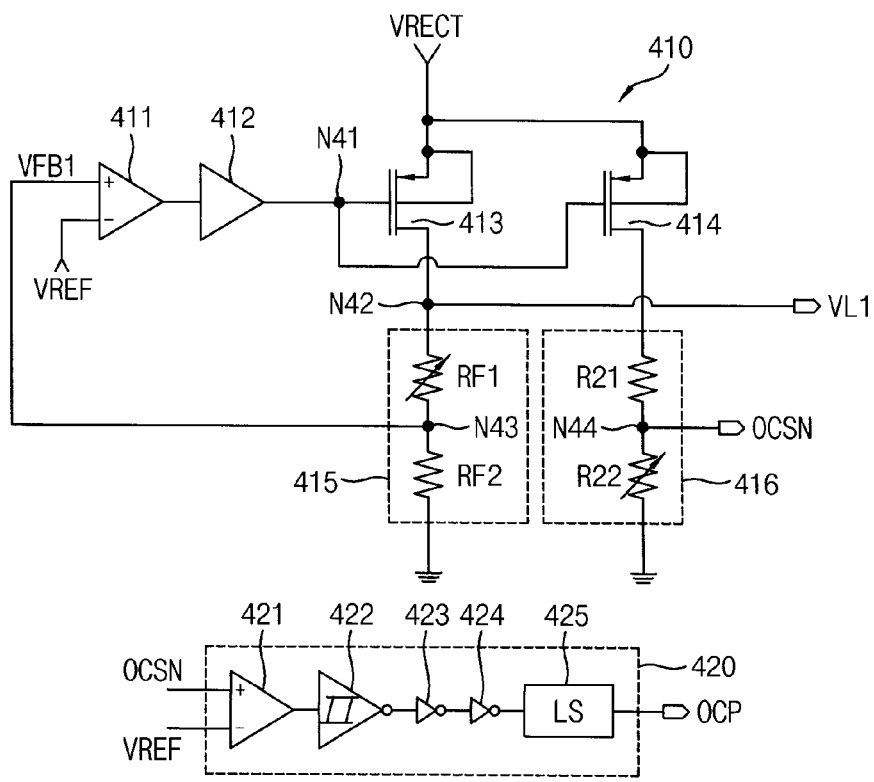
FIG. 9 is a circuit diagram illustrating an example of the high voltage regulator in FIG. 8 according to at least one example embodiment.

FIG. 9 is a circuit diagram illustrating an example of the high voltage regulator in FIG. 8 according to at least one example embodiment.

Referring to FIG. 9, the high voltage regulator 400 includes a voltage converting unit 410 and the over-current protection signal generator 420. The voltage converting unit 410 includes a comparator 411, a buffer 412, p-channel metal-oxide semiconductor (PMOS) transistors 413 and 414, a feedback unit 415 and an over-current sensing unit 416.

The PMOS transistor 413 includes a source receiving the rectified voltage VRECT, a gate connected to an output of the buffer 412 at a node N41, and a drain connected to the feedback unit 415 at a node N42. The PMOS transistor 414 includes a source receiving the rectified voltage VRECT, a gate connected to an output of the buffer 412 at a node N41, and a drain connected to the over-current sensing unit 416.

The feedback unit 415 includes a variable resistor RF1 and a resistor RF2 which are connected in series between the node N42 and the ground voltage, and the feedback unit 415 provides a feedback voltage VFB1 that the first load voltage VL1 is divided at a node N43 where the variable resistor RF1 and the resistor RF2 are connected to each other. The over-current sensing unit 416 includes a resistor R21 and a variable resistor R22 which are connected in series between the PMOS transistor 414 and the ground voltage, and the over-current sensing unit 416 provides an over-current sensing signal OCSN at a node N43 where the resistor R21 and the variable resistor R22 are connected to each other.

The comparator 411 compares the feedback voltage VFB1 and the reference voltage VREF and provides the buffer 412 with an output which is proportional to difference between the feedback voltage VFB1 and the reference voltage VREF. The buffer 412 buffers the output of the comparator 411 to the gates of the PMOS transistors 413 and 414. Therefore, the PMOS transistor 413 may convert a level of the rectified voltage VRECT to provide the first load voltage VL1 at the node N42 based on a current flowing through the channel of PMOS transistor 413. This current is inversely proportional to the difference between the feedback voltage VFB1 and the reference voltage VREF. Accordingly, as the level of the first load voltage VL1 increases, the level of the feedback voltage VFB1 increases and the output of the comparator 411 increases. Therefore, the output of the buffer 412 increases, and thus the level of the first load voltage VL1 decreases because the amount of current flowing through the channel of the PMOS transistor 413 decreases.

When the level of the first load voltage VL1 decreases, the level of the feedback voltage VFB1 also decreases and the output of the comparator 411 decreases. Therefore, the output of the buffer 412 decreases, and thus the level of the first load voltage VL1 increases because the amount of current flowing through the channel of the PMOS transistor 413 increases. Therefore, the first load voltage VL1 at the node N42 may have a regulated level.

The over-current protection signal generator 420 includes a comparator 421, a Schmidt trigger comparator 422, inverters 423 and 424, and a level shifter 425.

The comparator 421 compares the over-current sensing signal OCSN and the reference voltage VREF to provide an output which is proportional to difference between the over-current sensing signal OCSN and the reference voltage VREF. The Schmidt trigger comparator 422 inverts the output of the comparator 422 to be provided to the inverter 422 using hysteresis characteristic. The inverter 424 inverts the output of the inverter 423. The level shifter 425 shifts level of the output of the inverter 424 to provide an over-current protection signal OCP.

When the current flowing through the channel of the PMOS transistor 414, the level of the over-current sensing signal OCSN also increases. Therefore, the output level of the comparator 421 increases. When the output level of the comparator 421 excessively increases, the Schmidt trigger inverter 422 detects the output level of the comparator 421 and the over-current protection signal OCP is enabled.

Figure 10:
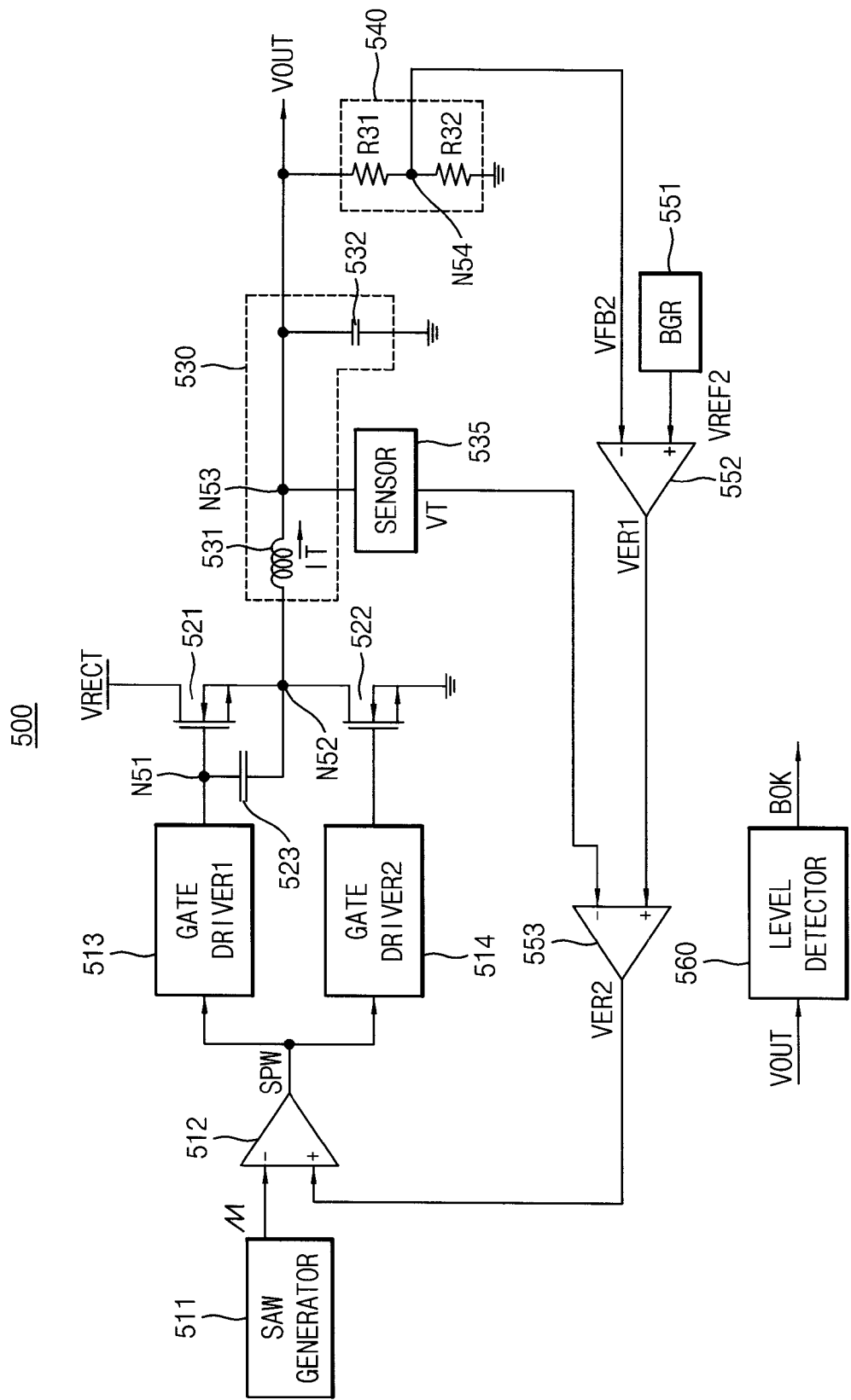
FIG. 10 is a circuit diagram illustrating the buck converter in FIG. 8 according to at least one example embodiment.

FIG. 10 is a circuit diagram illustrating the buck converter in FIG. 8 according to at least one example embodiment.

Referring to FIG. 10, the buck converter 500 includes a saw-tooth wave generator 511, a pulse-width modulation (PWM) comparator 512, first and second gate drivers 513 and 514, n-channel metal-oxide semiconductor (NMOS) transistors 521 and 522, a low-pass filter 530, a feedback unit 540, a sensor 535, a reference voltage generator 551, first and second error amplifiers 552 and 553, and a level detector 560.

The NMOS transistor 521 includes a drain receiving the rectified voltage VRECT, a gate connected to an output of the first gate driver 513, and a source connected to a node N52. The NMOS transistor 522 includes a drain connected to the node 522, a gate connected an output of the second gate driver 514, and a source connected to the ground voltage.

The low-pass filter 530 is connected between nodes N52 and N53 and includes an inductor 531 connected between the nodes N52 and N53 and a capacitor 532 connected to the node N53 and the ground voltage. The sensor 535 senses a current IT flowing through the inductor 531, and converts the current IT to a voltage VT to be provided to the second error amplifier 553.

The feedback unit 540 includes resistors R31 and R32 which are connected in series between a node N54 and the ground voltage. The feedback unit 540 provides a feedback voltage VFB2 that is the output voltage VOUT divided at the node N54 where the resistors R31 and R32 are connected to each other.

The first error amplifier 552 amplifies a voltage difference between the reference voltage VREF2 from the reference voltage generator 551 and the feedback voltage VFB2 to output a first error voltage VER1. The second error amplifier 553 amplifies voltage difference between the first error voltage VER1 and the voltage VT to output a second error voltage VER2.

The PWM comparator 512 compares the second error voltage VER2 and a saw-tooth wave from the saw-tooth wave generator 511 to output a pulse signal SPW having a pulse width corresponding to voltage difference between the second error voltage VER2 and the saw-tooth wave. The first gate driver 513 drives the first NMOS transistor 521 in response to the pulse signal SPW and the second gate driver 514 drives the second NMOS transistor 522 in response to the pulse signal SPW. Thus, the first and second gate drivers 513 and 514 complementarily operate. For example, when the first gate driver 513 turns-on the first NMOS transistor 521, the second gate driver 514 turns-off the second NMOS transistor 522. For example, when the first gate driver 513 turns-off the first NMOS transistor 521, the second gate driver 514 turns-on the second NMOS transistor 522.

The low-pass filter 530 low-pass filters a voltage at the node N52 to provide the output voltage VOUT. That is, low-pass filter 530 may filter harmonics having high frequency in the rectified voltage VRECT to provide the output voltage VOUT.

The level detector 560 detects low-to-high transition of the output signal VOUT to enable the transition detection signal BOK to be provided to the dual input linear regulator unit 600 (see FIG. 8).

For example, when the level of the output voltage VOUT decreases, the level of the feedback voltage VFB2 also decreases and thus the level of the first error voltage VER1 increases. When the level of the first error voltage VER1 increases, the level of the second error voltage VER2 increases. When the level of the second error voltage VER2 increases, a pulse width of the pulse signal PSW increases, the first gate driver 513 turns-on the first NMOS transistor 521 during a time interval corresponding to increased pulse width of the pulse signal PSW. Therefore, the level of the output voltage VOUT increases.

For example, when the level of the output voltage VOUT increases, the level of the feedback voltage VFB2 also increases and thus the level of the first error voltage VER1 decreases. When the level of the first error voltage VER1 decreases, the level of the second error voltage VER2 decreases. When the level of the second error voltage VER2 decreases, a pulse width of the pulse signal PSW decreases, the first gate driver 513 turns-on the first NMOS transistor 521 during a time interval corresponding to decreased pulse width of the pulse signal PSW. Therefore, the level of the output voltage VOUT decreases. In the above described manner, the buck converter 500 coverts the rectified voltage VRECT to the output voltage with a high power transformation efficiency.

Figure 11:
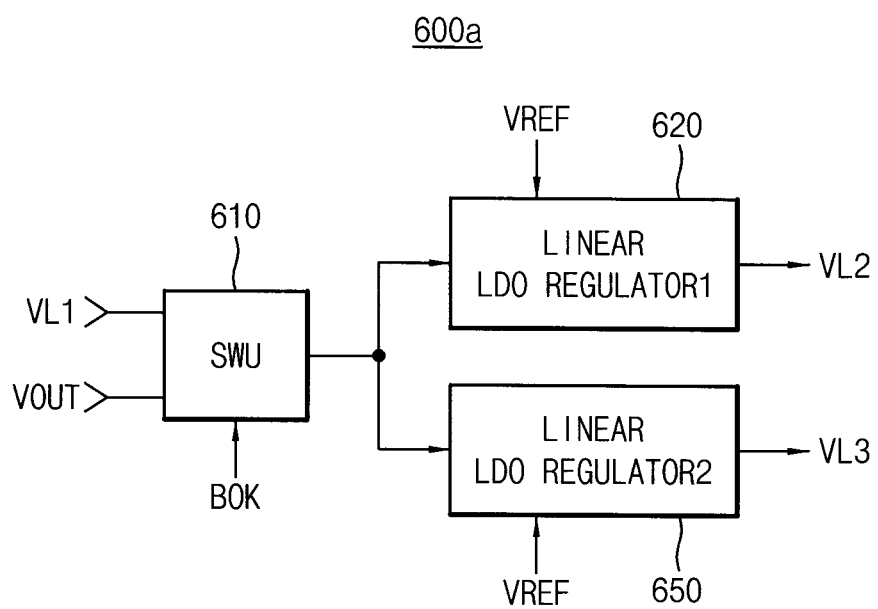
FIG. 11 is a block diagram illustrating an example of the dual input linear regulator unit in FIG. 8 according to at least one example embodiment.

FIG. 11 is a block diagram illustrating an example of the dual input linear regulator unit in FIG. 8 according to at least one example embodiment.

Referring to FIG. 11, a dual input linear regulator unit 600a may include a switching unit 610 and first and second linear regulators 620 and 640.

The switching unit 610 may provide the first and second linear regulators 620 and 640 with one of the first load voltage VL1 and the output voltage VOUT in response to the transition detection signal BOK. For example, when the transition detection signal BOK is low level (i.e., disabled) in the initializing period, the switching unit 610 may provide the first and second linear regulators 620 and 640 with the first load voltage VL1. During the initializing period, the first linear regulator 620 generates the second load voltage VL2 based on the first load voltage VL1 and the second linear regulator 640 generates the third load voltage VL3 based on the first load voltage VL1.

For example, when the transition detection signal BOK is high level (i.e., enabled) in the stabilizing period successive to the initializing period, the switching unit 610 may provide the first and second linear regulators 620 and 640 with the output voltage VOUT. During the stabilizing period, the first linear regulator 620 generates the second load voltage VL2 based on the output voltage VOUT and the second linear regulator 640 generates the third load voltage VL3 based on the output voltage VOUT.

Figure 12A:
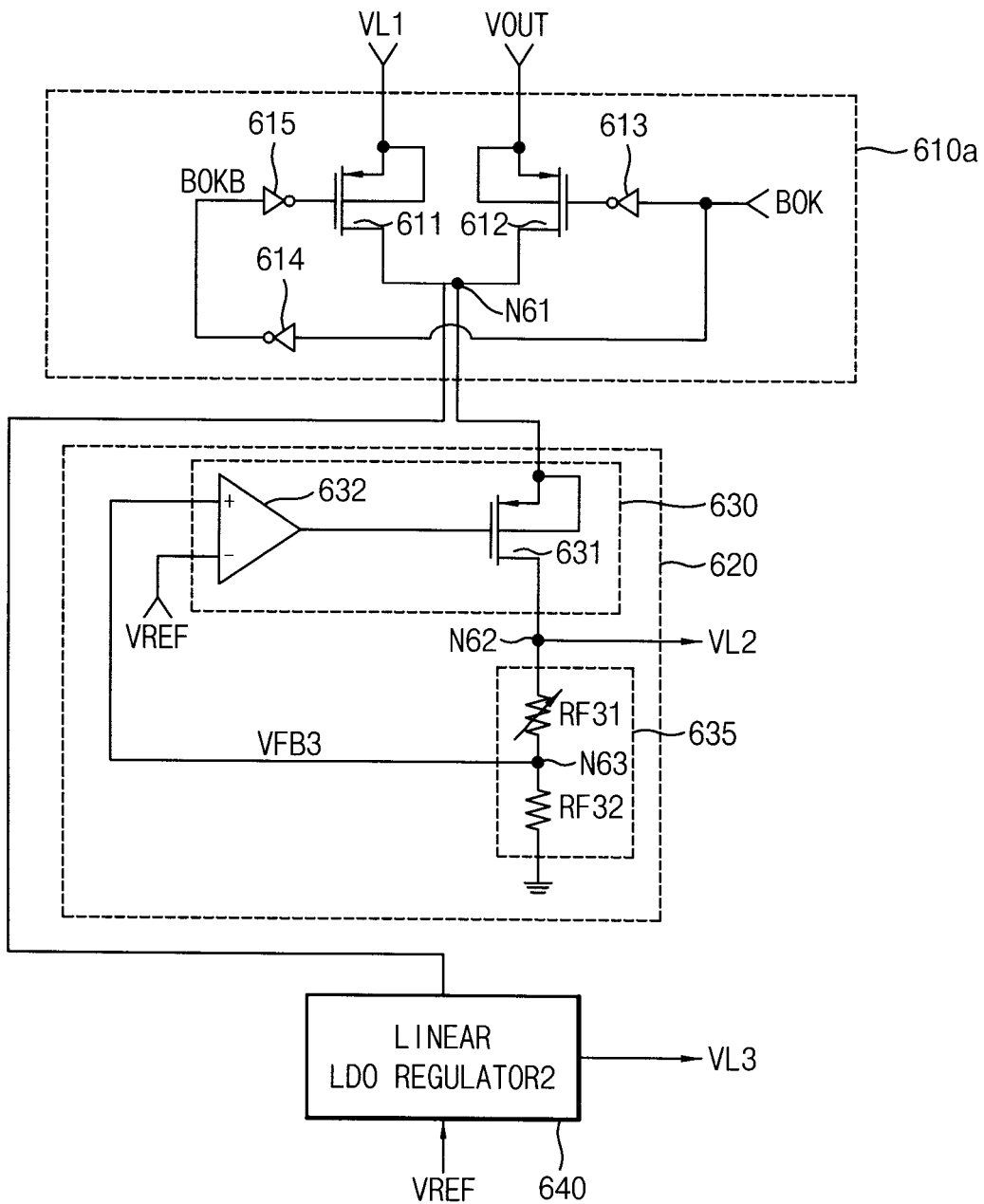
FIG. 12A is a circuit diagram illustrating the dual input linear regulator unit of FIG. 11 according to at least one example embodiment.

FIG. 12A is a circuit diagram illustrating the dual input linear regulator unit of FIG. 11 according to at least one example embodiment.

Referring to FIG. 12A, a switching unit 610a includes PMOS transistors 611 and 612 and inverters 613, 614 and 615.

The PMOS transistor 611 includes a source receiving the first load voltage VL1, a gate connected to an output of the inverter 615, and a drain connected to a node N61. The PMOS transistor 612 includes a source receiving the output voltage VOUT, a gate connected to an output of the inverter 613, and a drain connected to the node N61. Each body of the PMOS transistors 611 and 612 is connected to each source. The PMOS transistors 611 and 612 may be implemented with a power switch that can endure high voltage levels of the first load voltage VL1 and the output voltage VOUT.

The inverter 613 inverts the transition detection signal BOK to provide inverted version of the transition detection signal BOK to the gate of the PMOS transistor 612. The inverter 614 inverts the transition detection signal BOK to provide an inverted transition detection signal BOKB. The inverter 615 inverts the inverted transition detection signal BOKB to provide an inverted version of the inverted transition detection signal BOKB to the gate of the PMOS transistor 611. When the transition detection signal BOK has a low level and indicates the initializing period, the PMOS transistor 612 is turned-off and the PMOS transistor 611 is turned-on. Therefore, the switching unit 610a provides the first load voltage VL1 to the first and second linear regulators 620 and 640.

For example, when the transition detection signal BOK has a high level and indicates the stabilizing period, the PMOS transistor 612 is turned-on and the PMOS transistor 615 is turned-off. Therefore, the switching unit 610a provides the output voltage VOUT to the first and second linear regulators 620 and 640.

The first and second linear regulators 620 and 640 are connected in parallel at the node N61.

The first linear regulator 620 includes a driving unit 630 and a feedback unit 635. The driving unit 630 includes a PMOS transistor 631 and a comparator (or an operational amplifier) 632. The PMOS transistor 631 includes a source connected to the node N61, a gate connected to an output of the comparator 632 and a drain connected to the feedback unit 635 at a node N62. The second load voltage VL2 is provided at the node N62. The comparator 632 compares a feedback voltage VFB3 from the feedback unit 635 and the reference voltage VREF to provide the gate of the PMOS transistor 631 with an output which is proportional to voltage difference between the feedback voltage VFB3 and the reference voltage VREF. The feedback unit 635 includes a variable resistor RF31 and a resistor RF32 which are connected in series between the node N62 and the ground voltage. The feedback unit 635 provides the feedback voltage VFB3 that is the second load voltage VL2 divided at a node N63 where the variable resistor RF31 and the resistor RF32 are connected to each other.

The second linear regulator 650 has a substantially same configuration as the first linear regulator 620, and thus detailed description and operation on the second linear regulator 650 will be omitted.

As described above, during the initializing period, the first linear regulator 620 generates the second load voltage VL2 based on the first load voltage VL1, and the second linear regulator 640 generates the third load voltage VL3 based on the first load voltage VL1. During the stabilizing period, the first linear regulator 620 generates the second load voltage VL2 based on the output voltage VOUT, and the second linear regulator 640 generates the third load voltage VL3 based on the output voltage VOUT.

Figure 12B:
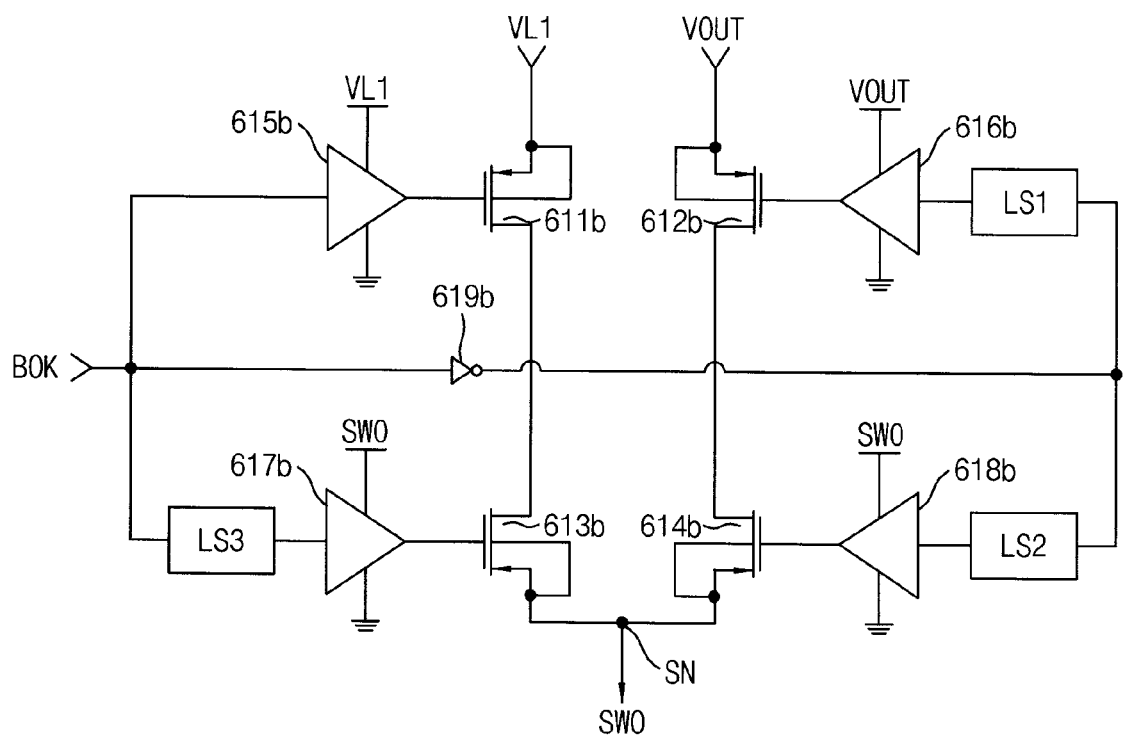
FIG. 12B illustrates an example of the switching unit in FIG. 11 according to at least one example embodiment.

FIG. 12B illustrates an example of the switching unit in FIG. 11 according to at least one example embodiment.

Referring to FIG. 12B, a switching unit 610b includes PMOS transistors 611b~614b, drivers 615b~618b, level shifters LS1~LS3 and an inverter 619b.

The PMOS transistor 611b includes a source receiving the first load voltage VL1, a gate connected to an output of the driver 615b and a drain connected to the PMOS transistor 613b. The PMOS transistor 612b includes a source receiving the output voltage VOUT, a gate connected to an output of the driver 616b and a drain connected to the PMOS transistor 614b. The PMOS transistor 613b has a source connected to a switching node SN, a gate connected to an output of the driver 617b and a drain connected to the PMOS transistor 611b. The PMOS transistor 614b has a source connected to the switching node SN, a gate connected to an output of the driver 618b and a drain connected to the PMOS transistor 612b. The PMOS transistors 613b and 614b are connected to each other at the switching node SN, and a switching output signal SWO is provided at the switching node SN. The switching node SN may be connected to the first and second linear regulators 620 and 640 as illustrated in FIG. 11.

Each body of the PMOS transistors 611b~614b is connected to each source and each of the PMOS transistors 611b~614b may be implemented with a power switch.

The driver 615b amplifies the transition detection signal BOK to drive the PMOS transistor 611b and the driver 615b is supplied with the first load voltage VL1 and the ground voltage. The driver 616b amplifies an inverted and level-shifted version of the transition detection signal BOK, by the inverter 619b and the level shifter LS1, to drive the PMOS transistor 612b, and the driver 616b is supplied with the output voltage VOUT and the ground voltage. The driver 617b amplifies a level-shifted version of the transition detection signal BOK, by the level shifter LS3, to drive the PMOS transistor 613b, and the driver 617b is supplied with the switching output signal SWO and the ground voltage. The driver 618b amplifies an inverted and level-shifted version of the transition detection signal BOK, by the inverter 619b and the level shifter LS2, to drive the PMOS transistor 614b, and the driver 614b is supplied with the switching output signal SWO and the ground voltage.

When the switching unit 610 of the dual input linear regulator unit 600a of FIG. 11 employs the switching unit 610b of FIG. 12B, during the initializing period, the first linear regulator 620 generates the second load voltage VL2 based on the first load voltage VL1 and the second linear regulator 650 generates the third load voltage VL3 based on the first load voltage VL1, and during the stabilizing period, the first linear regulator 620 generates the second load voltage VL2 based on the output voltage VOUT and the second linear regulator 640 generates the third load voltage VL3 based on the output voltage VOUT while reducing leakage current.

Figure 13:
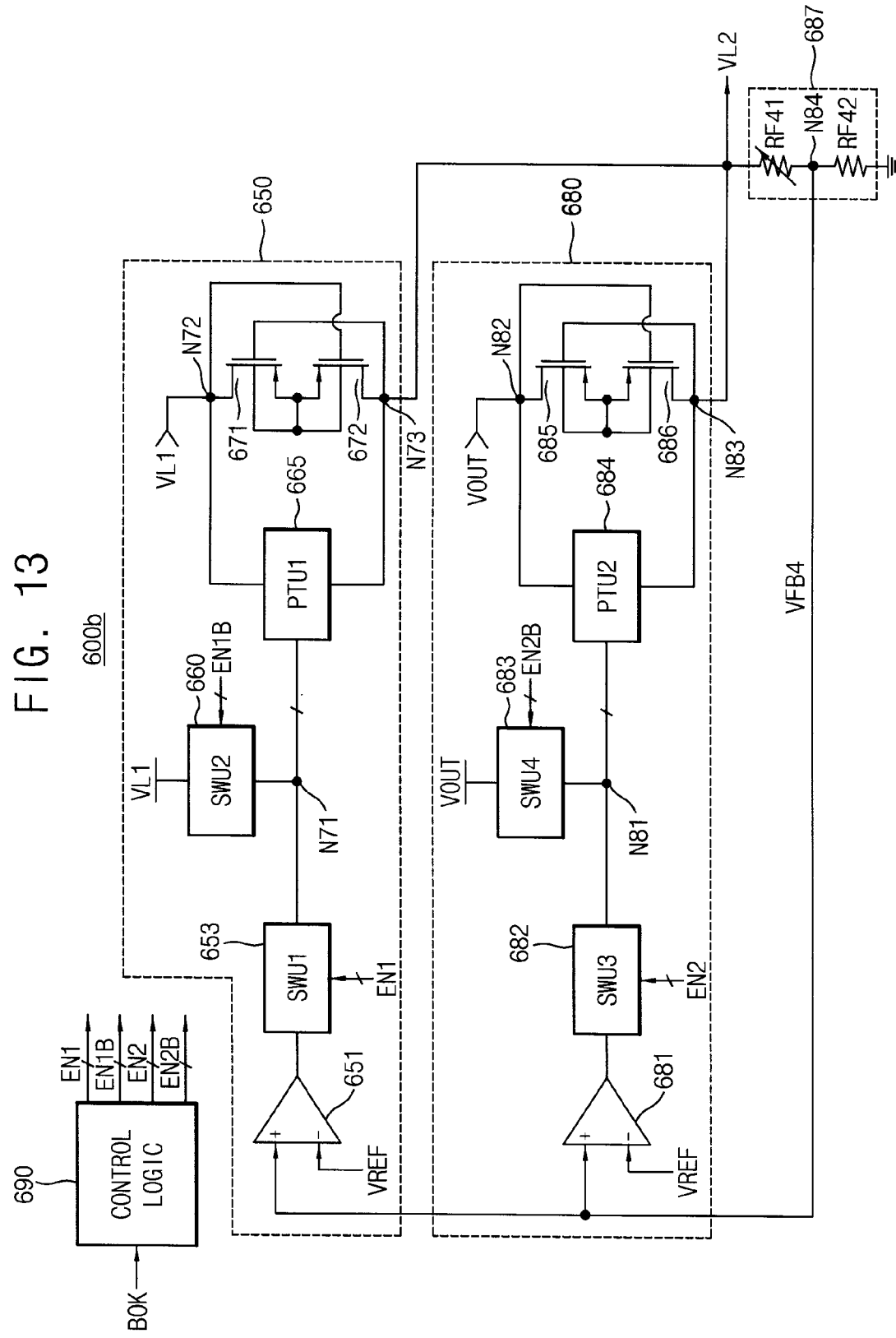
FIG. 13 illustrates another example of the dual input linear regulator unit in FIG. 8 according to at least one example embodiment.

FIG. 13 illustrates another example of the dual input linear regulator unit in FIG. 8 according to at least one example embodiment.

Referring to FIG. 13, a dual input linear regulator unit 600b may include a first converting unit 650, a second converting unit 680, a feedback unit 687 and a control logic 690.

The first converting unit 650 converts the first load voltage VL1 to the second load voltage VL2 in response to first and second enable signals EN1 and EN1B during the initializing period. The second converting unit 680 converts the output voltage VOUT to the second load voltage VL2 in response to third and fourth enable signals EN2 and EN2B during the stabilizing period. The feedback unit 687 divides the second load voltage VL2 to provide a feedback voltage VFB4. The control logic 690 may generate the first through fourth enable signals EN1, EN1B, EN2 and EN2B in response to the transition detection signal BOK.

The first converting unit 650 includes a comparator 651, a first switching unit 653, a second switching unit 660, a first parallel transistor unit 665 and PMOS transistors 671 and 672. The comparator 651 compares the feedback voltage VFB4 with the reference voltage VREF to provide the first switching unit 653 with an output which is proportional to voltage difference of the feedback voltage VFB4 and the reference voltage VREF.

The first switching unit 653, the second switching unit 660, and the first parallel transistor unit 665 are connected to a node N71. The first switching unit 653 provides the output of the comparator 651 to the first parallel transistor unit 665 in response to the first enable signal EN1 having a plurality of bits. The second switching unit 660 provides the first load voltage VL1 to the first parallel transistor unit 665 in response to the second enable signal EN1B having a plurality of bits.

The first parallel transistor unit 665 is connected to the PMOS transistor 671 at a node N72 and is connected to the PMOS transistor 672 at a node N73. The PMOS transistors 671 and 672 are connected in series between the nodes N72 and N73. Gate of the PMOS transistor 671 is connected to the node N73, the gate of the PMOS transistor 672 is connected to the node N72, and the first load voltage VL1 is applied to the node N72.

The first parallel transistor unit 665 may include a plurality of PMOS transistors which are connected in parallel with respect to one another.

The second converting unit 680 includes a comparator 681, a third switching unit 682, a fourth switching unit 683, a second parallel transistor unit 684, and PMOS transistors 685 and 686. The comparator 681 compares the feedback voltage VFB4 with the reference voltage VREF to provide the third switching unit 682 with an output which is proportional to voltage difference of the feedback voltage VFB4 and the reference voltage VREF.

The third switching unit 682, the fourth switching unit 683, and the second parallel transistor unit 684 are connected to a node N81. The third switching unit 682 provides the output of the comparator 681 to the second parallel transistor unit 684 in response to the third enable signal EN2 having a plurality of bits. The fourth switching unit 683 provides the output voltage VOUT to the second parallel transistor unit 684 in response to the fourth enable signal EN2B having a plurality of bits.

The second parallel transistor unit 684 is connected to the PMOS transistor 685 at a node N82 and is connected to the PMOS transistor 686 at a node N83. The PMOS transistors 685 and 686 are connected in series between the nodes N82 and N83. Gate of the PMOS transistor 685 is connected to the node N83, the gate of the PMOS transistor 686 is connected to the node N82, and the output voltage VOUT is applied to the node N82.

The second parallel transistor unit 684 may include a plurality of PMOS transistors which are connected in parallel with respect to one another.

The feedback unit 684 includes a variable resistor RF41 and a resistor RF42 which are connected in series between the node N83 and the ground voltage. The feedback unit 687 provides the feedback voltage VFB4 that is the second load voltage VL2 divided at a node N84 where the variable resistor RF41 and the resistor RF42 are connected to each other.

Each bit of the first enable signal EN1 is sequentially enabled and each bit of the second enable signal EN1B is sequentially disabled when operation period of the target device 200 transitions from the initializing period to the stabilizing period. In addition, each bit of the third enable signal EN2 is sequentially disabled and each bit of the fourth enable signal EN2B is sequentially enabled when operation period of the target device 200 transitions from the initializing period to the stabilizing period. The control logic 690 may include a counter that sequentially enables or disables each bit of the enable signals EN1, EN1B, EN2 and EN2B.

Figure 14:
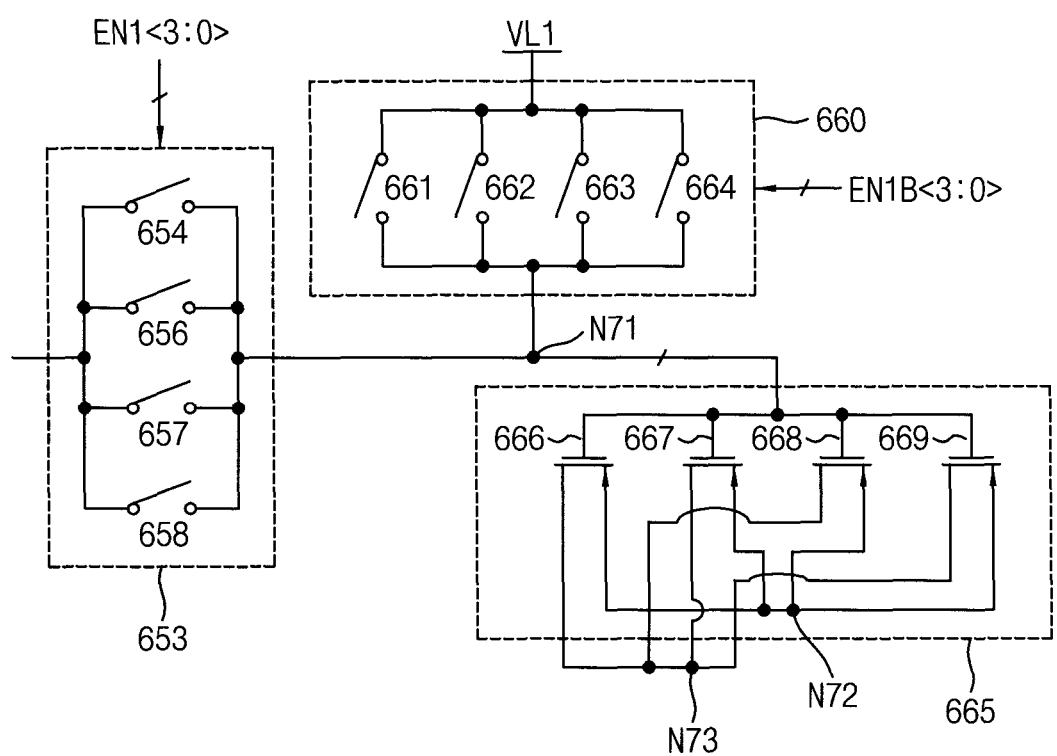
FIG. 14 is a circuit diagram illustrating a portion of the first converting unit in FIG. 13 according to at least one example embodiment.

FIG. 14 is a circuit diagram illustrating a portion of the first converting unit in FIG. 13 according to at least one example embodiment.

In FIG. 14, the first switching unit 653, the second switching unit 660 and the first parallel transistor unit 665 are illustrated.

Referring to FIGS. 13 and 14, the first switching unit 653 may include a plurality of switches 654-658 which are connected in parallel between the output of the comparator 654 and the node N71. Each bit of the first enable signal EN1<3:0> is applied to each of the switches 654-658. The second switching unit 660 may include a plurality of switches 661-664 which are connected in parallel between the first load voltage Vl1 and the node N71. Each bit of the second enable signal EN1B<3:0> is applied to each of the switches 661-664. The first parallel transistor unit 665 includes a plurality of PMOS transistors 666-669 between the nodes N71-N73.

For example, when the transition detection signal BOK is low level and indicates the initializing period, the control logic 690 activates the first and fourth enable signals EN1 and EN2B and deactivates the second and third enable signals EN1B and EN2. Therefore, the first converting unit 650 generates the second load voltage VL2 based on the first load voltage VL1.

For example, when the transition detection signal BOK is high level and indicates the stabilizing period, the control logic 690 deactivates the first and fourth enable signals EN1 and EN2B and activates the second and third enable signals EN1B and EN2. Therefore, the second converting unit 680 generates the second load voltage VL2 based on the output voltage VOUT.

For example, while the transition detection signal BOK is transitioning from a low level to a high level, the control logic 690 sequentially deactivates the first and fourth enable signals EN1 and EN2B and sequentially activates the second and third enable signals EN1B and EN2. Therefore, the second converting unit 680 generates the second load voltage VL2 based on the output voltage VOUT. When the first and fourth enable signals EN1 and EN2B are sequentially deactivated and the second and third enable signals EN1B and EN2 are sequentially activated during a transition period, the PMOS transistors 666-669 are sequentially turned off during the transition period and the PMOS transistors in the second parallel transistor unit 684 are sequentially turned on. Therefore, undershoot or overshoot during the transition period may be mitigated (or alternatively, prevented).

Undershoot or overshoot may occur when a heavy load is connected to a voltage converter 300 and a power path is changed. However, the amount of undershoot or overshoot during the transition interval may be reduced by sequentially deactivating the first and fourth enable signals EN1 and EN2B and sequentially activating the second and third enable signals EN1B and EN2 to sequentially turn off the PMOS transistors 666-~669 and to sequentially turn on the PMOS transistors in the second parallel transistor unit 684.

Figure 15:
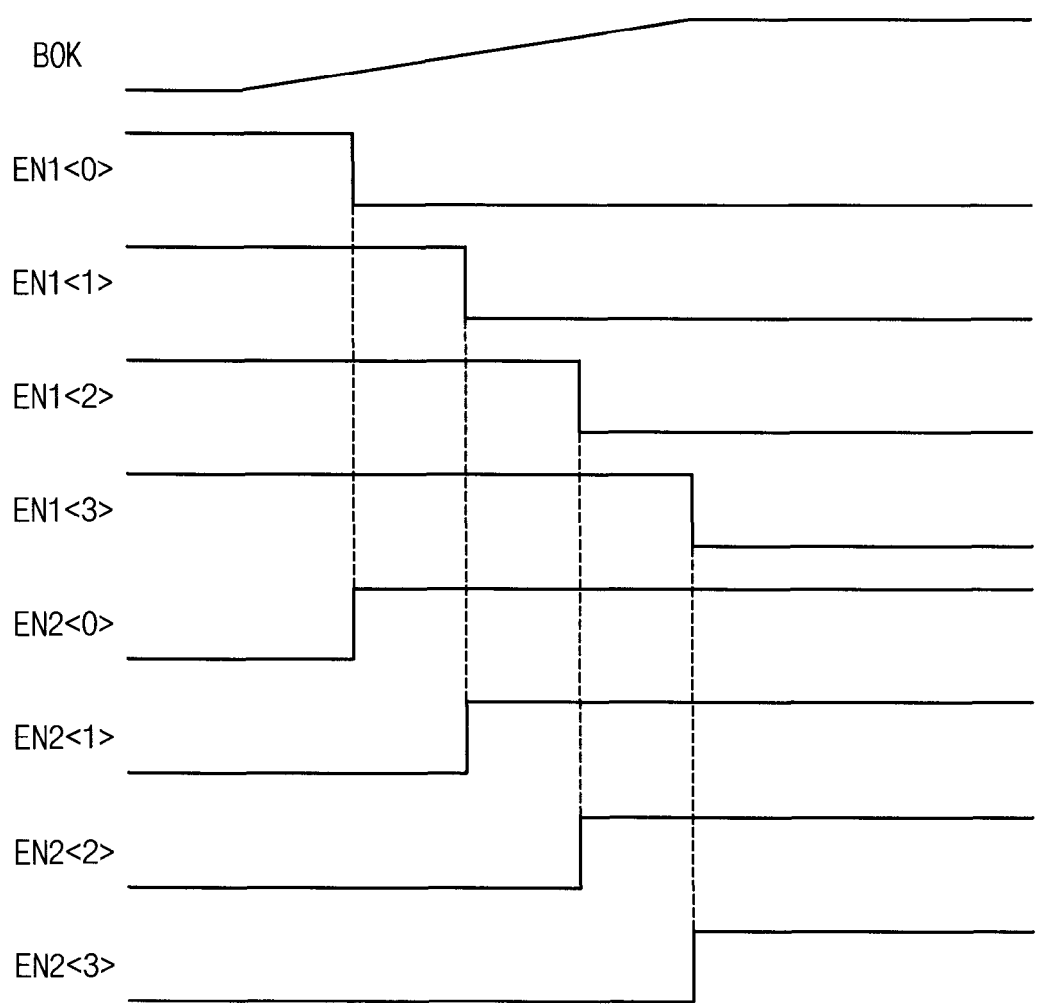
FIG. 15 illustrates the first and third enable signals from the control logic in FIG. 13 during the transition interval.

FIG. 15 illustrates the first and third enable signals from the control logic in FIG. 13 during the transition interval.

Referring to FIGS. 13 to 15, during the transition interval when the transition detection signal BOK transitions from a low level to a high level, each bit of the first enable signal EN1<0>-EN1<3> is sequentially deactivated and each bit of the third enable signal EN2<0>-EN3<3> is sequentially activated.

Figure 16:
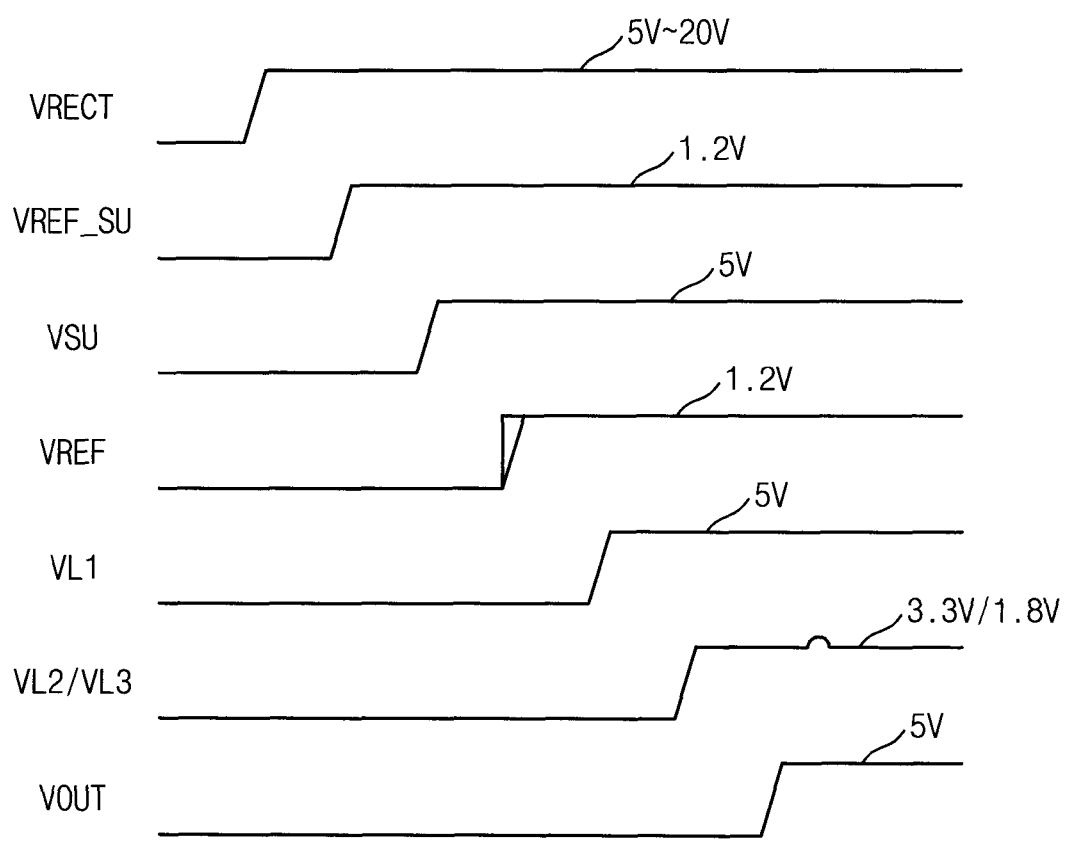
FIG. 16 is a timing diagram illustrating a power sequence of the voltage converter of FIG. 5 according to at least one example embodiment.

FIG. 16 is a timing diagram illustrating a power sequence of the voltage converter of FIG. 5 according to at least one example embodiment.

Referring to FIGS. 5, 7, 8 and 16, the start-up band-gap voltage generator 231 generates the first start-up voltage VREF_SU transitioning to a high level in response to the rectified voltage VRECT transitioning to a high level. The start-up LDO regulator 233 generates the second start-up voltage VSU transitioning to a high level in response to the first start-up voltage VREF_SU transitioning to a high level and the rectified voltage VRECT transitioning to a high level. The main band-gap voltage generator 234 generates the reference voltage VREF transitioning to a high level in response to the first start-up voltage VREF_SU and the second start-up voltage VSU. The high voltage regulator 400 generates the first load voltage VL1 transitioning to the first level in response to the reference voltage VREF transitioning to a high level and the dual input linear regulator unit 600 generates the second and third load voltages VL2 and VL3 based on the first load voltage VL1 during the initializing period. The buck converter 500 generates the output voltage VOUT transitioning to the first level in response to the first load voltage VL1 transitioning to a high level. Therefore, the buck converter 500 in the voltage converter 300 generates the output voltage VOUT at a last sequence of the power sequence.

The rectified voltage VRECT may have a level of about 5V to about 20V, the first start-up voltage VREF_SU may have a level of about 1.2V, the second start-up voltage VSU may have a level of about 5V, the reference voltage VREF may have a level of about 1.2V, the first load voltage VL1 may have a level of about 5V, the second load voltage VL2 may have a level of about 3.3V, the third load voltage VL3 may have a level of about 1.8V and the output voltage VOUT may have a level of about 5V.

Therefore, the voltage converter 300 generates the second voltage VL2 used in digital blocks based on the first load voltage VL1 and output from the high voltage regulator 400 during the initializing period. The voltage converter 300 generates the second load voltage VL2 used in a charger and digital blocks based on the output voltage VOUT and output from the buck converter 500 whose power transformation efficiency is higher than that of the high voltage regulator 400 during the stabilizing period. In view of the above, the voltage converter 300 may reduce power consumption.

As described with reference to FIGS. 1 through 16, in the wireless power transmission system 10 using magnetic resonance, due to a varying location of the source device 100 with respect to the target device 200, the fluctuation level of the rectified voltage VRECT varies greatly according to relative position of the source device 100 and the target device 200. Although the fluctuation level of the rectified voltage VRECT varies greatly, the power consumption of an overall system may be reduced by generating the second load voltage VL2 based on the output voltage VOUT from the buck converter 500 whose power transformation efficiency is higher than that of the high voltage regulator 400 during the stabilizing period.

Figure 17:
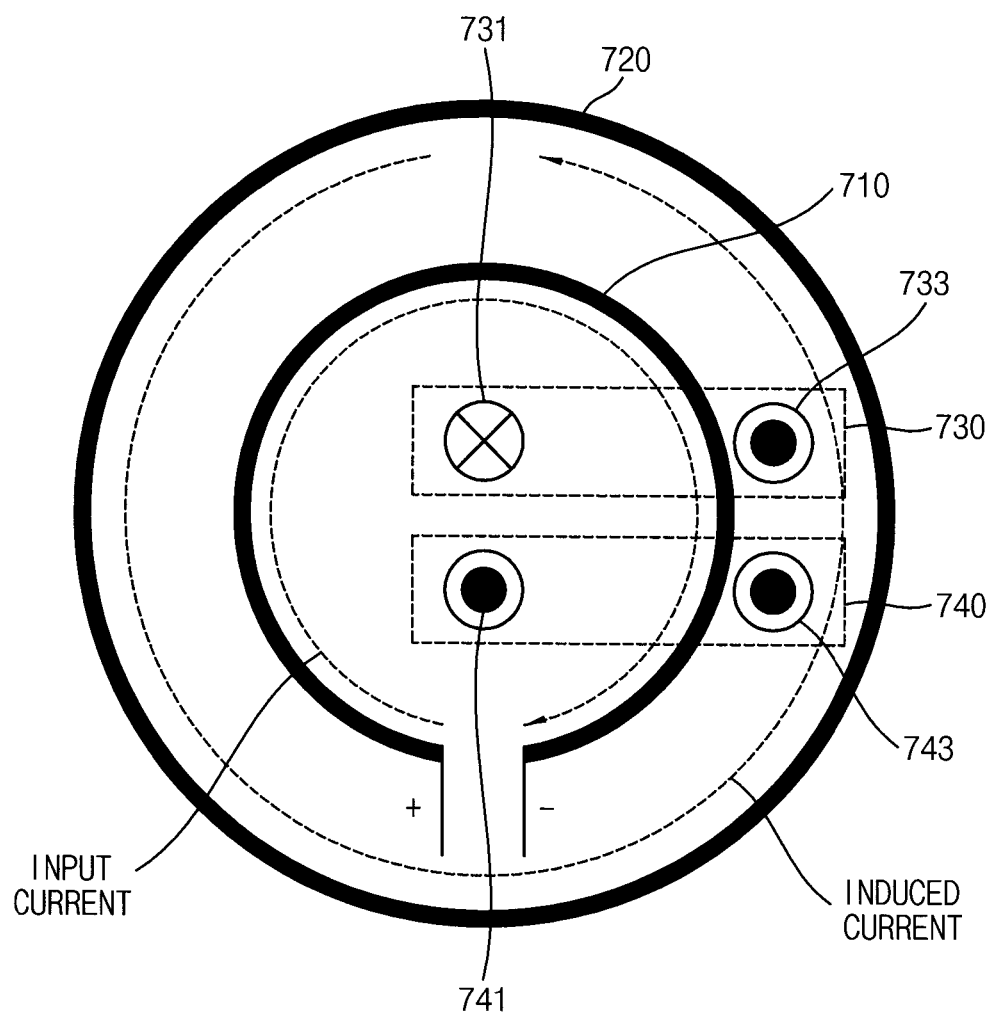
FIGS. 17 and 18 illustrate distributions of a magnetic field in a feeder and a source resonator.
Figure 18:
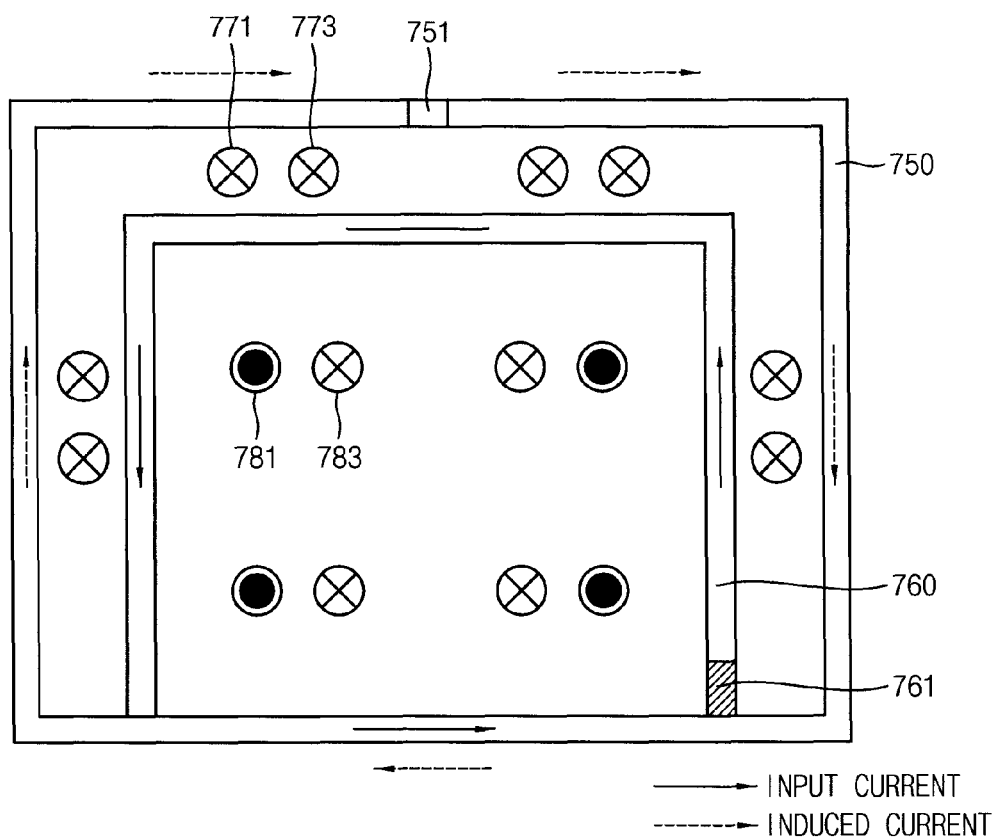

FIGS. 17 and 18 illustrate distributions of a magnetic field in a feeder and a source resonator.

When a resonator (e.g., the target resonator 201 from FIG. 1) receives power through a separate feeder, magnetic fields may be formed in both the feeder and the resonator.

Referring to FIG. 17, as an input current flows in a feeder 710, a magnetic field 730 may be formed. A direction 731 of the magnetic field 730 within the feeder 710 may have a phase opposite to a phase of a direction 733 of the magnetic field 730 outside the feeder 710. The magnetic field 730 formed by the feeder 710 may cause an induced current to be formed in a source resonator 720. The direction of the induced current may be opposite to a direction of the input current.

Due to the induced current, a magnetic field 740 may be formed in the source resonator 720. Directions of a magnetic field formed due to an induced current in all positions of the source resonator 720 may be identical. Accordingly, a direction 741 of the magnetic field 740 formed by the source resonator 720 may have the same phase as a direction 743 of the magnetic field 740 formed by the source resonator 720.

Consequently, when the magnetic field 730 formed by the feeder 710 and the magnetic field 740 formed by the source resonator 720 are combined, strength of the total magnetic field may decrease within the feeder 710, but may increase outside the feeder 710. In an example in which a power is supplied to the source resonator 720 through the feeder 710 configured as illustrated in FIG. 17, the strength of the total magnetic field may decrease in the center of the source resonator 720, but may increase outside the source resonator 720. When a magnetic field is randomly distributed in the source resonator 720, it may be difficult to perform impedance matching, since an input impedance may frequently vary. Additionally, when the strength of the total magnetic field is increased, an efficiency of wireless power transmission may be increased. Conversely, when the strength of the total magnetic field is decreased, the efficiency for wireless power transmission may be reduced. Accordingly, the power transmission efficiency may be reduced on average.

When a magnetic field in a target resonator is distributed as illustrated in FIG. 17 current flowing in the source resonator 720 may be induced by the input current flowing in the feeder 710. The current flowing in the target resonator may be induced by a magnetic coupling between the source resonator 720 and the target resonator. The current flowing in the target resonator may cause a magnetic field to be formed, so that an induced current may be generated in a feeder located in the target resonator. When a direction of a magnetic field within the feeder formed by the target resonator has a phase opposite to a phase of a direction of a magnetic field formed by the feeder and accordingly, the strength of the total magnetic field may be reduced.

FIG. 18 illustrates a wireless power transmitter in which a source resonator 750 and a feeder 760 have a common ground. The source resonator 750 may include a capacitor 751. The feeder 760 may receive an input of a radio frequency (RF) signal via a port 761.

For example, when the RF signal is received to the feeder 760, an input current may be generated in the feeder 760. The input current flowing in the feeder 760 may cause a magnetic field to be formed, and a current may be induced in the source resonator 750 by the magnetic field. Additionally, another magnetic field may be formed due to the induced current flowing in the source resonator 750. The direction of the input current flowing in the feeder 760 may have a phase opposite to a phase of a direction of the induced current flowing in the source resonator 750. Accordingly, in a region between the source resonator 750 and the feeder 760, a direction 771 of the magnetic field formed due to the input current may have the same phase as a direction 773 of the magnetic field formed due to the induced current, and thus the strength of the total magnetic field may increase. Conversely, within the feeder 760, a direction 781 of the magnetic field formed due to the input current may have a phase opposite to a phase of a direction 783 of the magnetic field formed due to the induced current, and thus the strength of the total magnetic field may decrease. Therefore, the strength of the total magnetic field may decrease in the center of the source resonator 750, but may increase outside the source resonator 750.

The feeder 760 may determine an input impedance by adjusting an internal area of the feeder 760. The input impedance refers to an impedance viewed in a direction from the feeder 760 to the source resonator 750. When the internal area of the feeder 760 is increased, the input impedance may be increased. Conversely, when the internal area of the feeder 760 is reduced, the input impedance may be reduced. Since the magnetic field is randomly distributed in the source resonator 750 despite a reduction in the input impedance, a value of the input impedance may vary depending on a location of a target device. Accordingly, a separate matching network may be required to match the input impedance to an output impedance of a power amplifier. For example, when the input impedance is increased, a separate matching network may be used to match the increased input impedance to a relatively low output impedance.

When a target resonator has the same configuration as the source resonator 750, and when a feeder of the target resonator has the same configuration as the feeder 760, a separate matching network may be desired because a direction of a current flowing in the target resonator has a phase opposite to a phase of a direction of an induced current flowing in the feeder of the target resonator.

Figure 19:
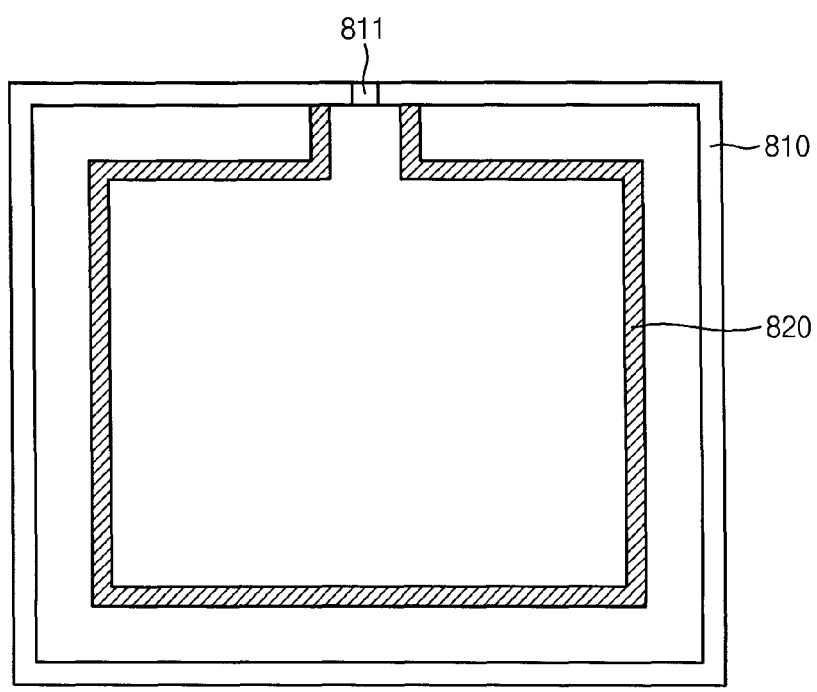
FIG. 19 illustrates a wireless power transmission device.

FIG. 19 illustrates a wireless power transmission device according to at least one example embodiment.

Referring to FIG. 19 the wireless power transmission device may include a source resonator 810 and a feeding unit 820. The source resonator 810 may include a capacitor 811. The feeding unit 820 may be electrically connected to both ends of the capacitor 811.

Figure 20:
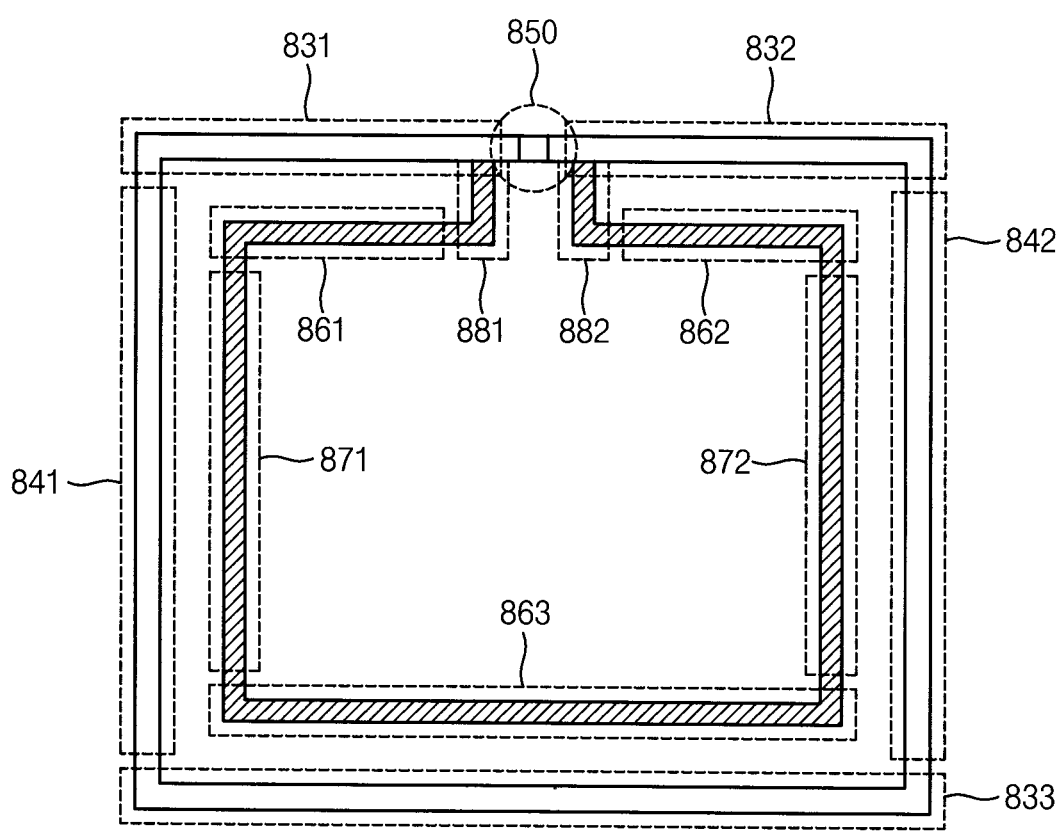
FIG. 20 illustrates, in detail, a structure of the wireless power transmission device of FIG. 19.

FIG. 20 illustrates, in detail, a structure of the wireless power transmission device of FIG. 19.

The source resonator 810 may include a first transmission line, a first conductor 841, a second conductor 842, and at least one first capacitor 850.

The first capacitor 850 may be inserted in series between a first signal conducting portion 831 and a second signal conducting portion 832 in the first transmission line, and an electric field may be confined within the first capacitor 850. For example, the first transmission line may include at least one conductor in an upper portion of the first transmission line, and may also include at least one conductor in a lower portion of the first transmission line. Current may flow through the at least one conductor disposed in the upper portion of the first transmission line, and the at least one conductor disposed in the lower portion of the first transmission line may be electrically grounded. For example, a conductor disposed in an upper portion of the first transmission line may be separated into two and thereby be referred to as the first signal conducting portion 831 and the second signal conducting portion 832. A conductor disposed in a lower portion of the first transmission line may be referred to as a first ground conducting portion 833.

As illustrate in FIG. 19, the source resonator 810 may have a two-dimensional (2D) structure. The first transmission line may include the first signal conducting portion 831 and the second signal conducting portion 832 in the upper portion of the first transmission line. In addition, the first transmission line may include the first ground conducting portion 833 in the lower portion of the first transmission line. The first signal conducting portion 831 and the second signal conducting portion 832 may be disposed to face the first ground conducting portion 833. The current may flow through the first signal conducting portion 831 and the second signal conducting portion 832.

Additionally, one end of the first signal conducting portion 831 may be electrically connected (i.e., shorted) to the first conductor 841, and another end of the first signal conducting portion 831 may be connected to the first capacitor 850. One end of the second signal conducting portion 832 may be shorted to the second conductor 842, and another end of the second signal conducting portion 832 may be connected to the first capacitor 850. Accordingly, the first signal conducting portion 831, the second signal conducting portion 832, the first ground conducting portion 833, and the conductors 841 and 842 may be connected to each other so that the source resonator 810 may have an electrically closed-loop structure. The term "loop structure" as used herein may include, for example, a polygonal structure such as a circular structure, a rectangular structure, or the like that forms a circuit which is electrically closed. The first capacitor 850 may be inserted into an intermediate portion of the first transmission line. For example, the first capacitor 850 may be inserted or otherwise positioned into a space between the first signal conducting portion 831 and the second signal conducting portion 832. The first capacitor 850 may be configured as a lumped element, a distributed element, or the like. For example, a distributed capacitor configured as a distributed element may include zigzagged conductor lines and a dielectric material that has a high permittivity between the zigzagged conductor lines.

When the first capacitor 850 is inserted into the first transmission line, the source resonator 810 may have a characteristic of a meta-material. The meta-material indicates a material having a desired (or alternatively, predetermined) electrical property that has not been discovered in nature, and thus, may have an artificially designed structure. An electromagnetic characteristic of the materials existing in nature may have a unique magnetic permeability or a unique permittivity. Most materials may have a positive magnetic permeability or a positive permittivity.

In the case of most materials, a right hand rule may be applied to an electric field, a magnetic field, and a pointing vector, and thus, the corresponding materials may be referred to as right handed materials (RHMs). However, the meta-material that has a magnetic permeability or a permittivity absent in nature may be classified into an epsilon negative (ENG) material, a mu negative (MNG) material, a double negative (DNG) material, a negative refractive index (NRI) material, a left-handed (LH) material, and the like, based on a sign of the corresponding permittivity or magnetic permeability.

When a capacitance of the first capacitor 850 inserted as the lumped element is appropriately determined, the source resonator 810 may have the characteristic of the meta-material. Because the source resonator 810 may have a negative magnetic permeability by appropriately adjusting the capacitance of the first capacitor 850, the source resonator 810 may also be referred to as an MNG resonator. Various criteria may be applied to determine the capacitance of the first capacitor 850. For example, the various criteria may include a criterion for enabling the source resonator 810 to have the characteristic of the meta-material, a criterion for enabling the source resonator 810 to have a to negative magnetic permeability in a target frequency, a criterion for enabling the source resonator 810 to have a zeroth order resonance characteristic in the target frequency, and the like. Based on at least one criterion among the aforementioned criteria, the capacitance of the first capacitor 850 may be determined.

The source resonator 810, also referred to as the MNG resonator 810, may have a zeroth order resonance characteristic of having, as a resonance frequency, a frequency when a propagation constant is "0". Because the source resonator 810 may have the zeroth order resonance characteristic, the resonance frequency may be independent with respect to a physical size of the MNG resonator 810. By appropriately designing the first capacitor 850, the MNG resonator 810 may sufficiently change the resonance frequency. Accordingly, the physical size of the MNG resonator 810 may not be changed.

In a near field, the electric field may be concentrated on the first capacitor 850 inserted into the first transmission line. Accordingly, due to the first capacitor 850, the magnetic field may become dominant in the near field. The MNG resonator 810 may have a relatively high Q-factor using the first capacitor 850 of the lumped element, and thus, it is possible to enhance an efficiency of power transmission. For example, the Q-factor may indicate a level of an ohmic loss or a ratio of a reactance with respect to a resistance in the wireless power transmission. The efficiency of the wireless power transmission may increase according to an increase in the Q-factor.

In at least one example embodiment, a magnetic core may be further provided to pass through the MNG resonator 810. The magnetic core may increase the power transmission distance.

As illustrated in FIG. 19, the feeding unit 820 may include a second transmission line, a third conductor 871, a fourth conductor 872, a fifth conductor 881, and a sixth conductor 882.

The second transmission line may include a third signal conducting portion 861 and a fourth signal conducting portion 862 in an upper portion of the second transmission line. In addition, the second transmission line may include a second ground conducting portion 863 in a lower portion of the second transmission line. The third signal conducting portion 861 and the fourth signal conducting portion 862 may be disposed to face the second ground conducting portion 863. Current may flow through the third signal conducting portion 861 and the fourth signal conducting portion 862.

Additionally, one end of the third signal conducting portion 861 may be shorted to the third conductor 871, and another end of the third signal conducting portion 861 may be connected to the fifth conductor 881. One end of the fourth signal conducting portion 862 may be shorted to the fourth conductor 872, and another end of the fourth signal conducting portion 862 may be connected to the sixth conductor 882. The fifth conductor 881 may be connected to the first signal conducting portion 831, and the sixth conductor 882 may be connected to the second signal conducting portion 832. The fifth conductor 881 and the sixth conductor 882 may be connected in parallel to both ends of the first capacitor 850. In addition, the fifth conductor 881 and the sixth conductor 882 may be used as input ports to receive an input of an RF signal.

Accordingly, the third signal conducting portion 861, the fourth signal conducting portion 862, the second ground conducting portion 863, the third conductor 871; and the fourth conductor 872, the fifth conductor 881, the sixth conductor 882, and the source resonator 810 may be connected to each other, so that the source resonator 810 and the feeding unit 820 may have an electrically closed-loop structure. When an RF signal is received via the fifth conductor 881 or the sixth conductor 882, an input current may flow in the feeding unit 820 and the source resonator 810, a magnetic field may be formed due to the input current, and a current may be induced to the source resonator 810 by the formed magnetic field. A direction of the input current flowing in the feeding unit 820 may be identical to a direction of the induced current flowing in the source resonator 810 and thus, strength of the total magnetic field may increase in the center of the source resonator 810, but may decrease outside the source resonator 810.

An input impedance may be determined based on an area of a region between the source resonator 810 and the feeding unit 820 and accordingly, a separate matching network used to match the input impedance to an output impedance of a power amplifier may not be required. For example, even when the matching network is used, the input impedance may be determined by adjusting a size of the feeding unit 820 and thus, a structure of the matching network may be simplified. The simplified structure of the matching network may minimize a matching loss of the matching network.

The second transmission line, the third conductor 871, the fourth conductor 872, the fifth conductor 881, and the sixth conductor 882 may form the same structure as the source resonator 810. When the source resonator 810 has a loop structure, the feeding unit 820 may also have a loop structure. For example, when the source resonator 810 has a circular structure, the feeding unit 820 may also have a circular structure.

The above-described configuration of the source resonator 810 and configuration of the feeding unit 820 may equally be applied to the target resonator and the feeding unit of the target resonator, respectively. When the feeding unit of the target resonator is configured as described above, the feeding unit may match an output impedance of the target resonator and an input impedance of the feeding unit, by adjusting a size of the feeding unit. Accordingly, a separate matching network may not be used in some instances.

Figure 21:
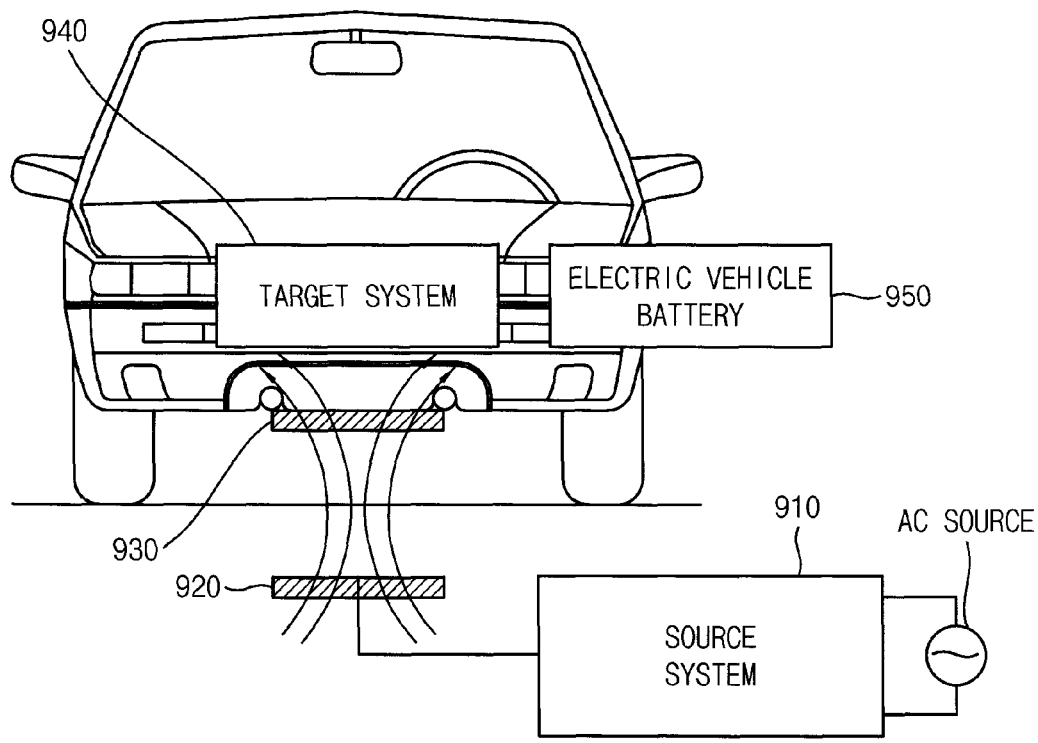
FIG. 21 illustrates an example of an electric vehicle charging system according to at least one example embodiment.

FIG. 21 illustrates an example of an electric vehicle charging system.

Referring to FIG. 21, an electric vehicle charging system 900 includes a source system 910, a source resonator 920, a target resonator 930, a target system 940, and an electric vehicle battery 950.

The electric vehicle charging system 900 may have a similar structure to the wireless power transmission and charging system of FIG. 1. The source system 910 and the source resonator 920 in the electric vehicle charging system 900 may function as a source. Additionally, the target resonator 930 and the target system 940 in the electric vehicle charging system 900 may function as a target.

The source system 910 may include a SMPS, a power detector, a power amplifier, a matching network, a TX control unit, and a communication unit, similarly to the source 105 of FIG. 2. The target system 940 may include a matching network, a rectifier, a voltage converter, a charger, a battery, radio frequency (RF) blocks, digital blocks, and a RX control unit, similarly to the target 205 of FIG. 5.

The electric vehicle battery 950 may be charged by the target system 940.

The electric vehicle charging system 900 may use a resonant frequency in a band of a few kilohertz (KHz) to tens of MHz.

The source system 910 may generate power based on a type of charging vehicle, a capacity of a battery, and a charging state of a battery, and may supply the generated power to the target system 940.

The source system 910 may control the source resonator 920 and the target resonator 930 to be aligned. For example, when the source resonator 920 and the target resonator 930 are not aligned, the control/communication unit of the source system 910 may transmit a message to the target system 940, and may control alignment between the source resonator 920 and the target resonator 930.

For example, when the target resonator 930 is not located in a position enabling maximum magnetic resonance, the source resonator 920 and the target resonator 930 may not be aligned. When a vehicle does not stop accurately, the source system 910 may induce a position of the vehicle to be adjusted, and may control the source resonator 920 and the target resonator 930 to be aligned.

The source system 910 and the target system 940 may transmit or receive an ID of a vehicle, or may exchange various messages, through communication.

The descriptions of FIGS. 2 through 20 may be applied to the electric vehicle charging system 900. However, the electric vehicle charging system 900 may use a resonant frequency in a band of a few KHz to tens of MHz, and may transmit power that is equal to or higher than tens of watts to charge the electric vehicle battery 2050.

Figure 22:
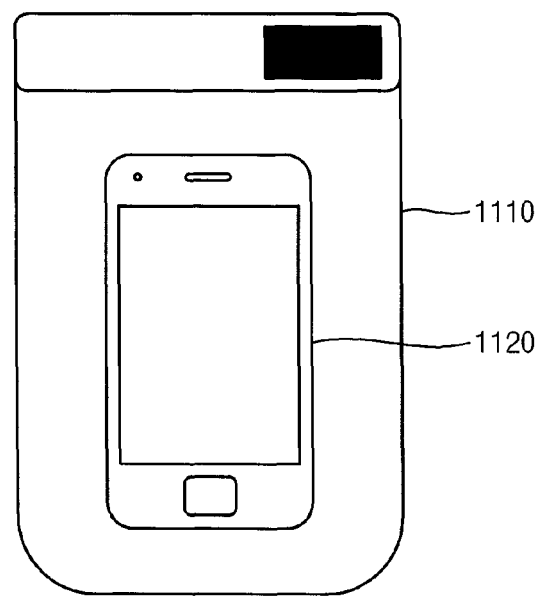
FIG. 22 illustrates an example of application in which a wireless power receiver and a wireless power transmitter may be mounted.

FIG. 22 illustrates an example of application in which a wireless power receiver and a wireless power transmitter may be mounted.

FIG. 22 illustrates an example of wireless power charging between a pad 1110 and a mobile terminal 1120.

In an example, a wireless power transmission device (that is, the source device 100) may be mounted in the pad 1110, and a wireless power reception device (that is, the target device 200) may be mounted in the mobile terminal 1120. The pad 1110 may be used to charge a single mobile terminal, namely the mobile terminal 1120. The descriptions of FIGS. 2 through 20 may be applied to the pad 1110 and the mobile terminal 1120. A wireless power reception device in the mobile terminal 1120 includes a power converter, and the power converter generates the second voltage used in digital blocks based on the first load voltage output from the high voltage regulator during the initializing period, and generates the second load voltage used in a charger and digital blocks based on the output voltage output from the buck converter whose power transformation efficiency is higher than that of the high voltage regulator during the stabilizing period. Therefore, the voltage converter may reduce power consumption in the mobile terminal 1120.

As mentioned above, a voltage converter in a wireless power reception device generates a second voltage used in digital blocks based on a first load voltage output from a high voltage regulator during an initializing period, and generates the second load voltage used in a charger and digital blocks based on output voltage from the buck converter whose power transformation efficiency is higher than that of the high voltage regulator during a stabilizing period successive to the initializing period, and thus may reduce power consumption.

The above described example embodiments may be applied to various wireless charging system. For example, the above described example embodiments may be applied to wireless charging of a mobile terminal and a battery of electric vehicle, and the like.

While the inventive concepts have been described with reference to exemplary embodiments, it will be apparent to those skilled in the art that various changes and modifications may be made without departing from the spirit and scope of the inventive concepts. Therefore, it should be understood that the above example embodiments are not limiting, but illustrative.

What is claimed is:

1. A voltage converter comprising:
   a high voltage regulator configured to convert a rectified voltage to a first load voltage, the rectified voltage being a voltage rectified from an input voltage;
   a buck converter configured to,
      generate an output voltage having a first level based on the rectified voltage during a stabilizing period, the stabilizing period being a period in which a target device associated with the voltage converter is in stable operation, and
      generate a transition detection signal that is configured to be enabled in response to the output voltage transitioning to the first level, the stabilizing period being successive to an initializing period, the initializing period being a period in which the target device begins operation; and
   a dual input linear regulator unit configured to,
      receive the first load voltage, the output voltage, the transition detection signal, and a reference voltage,
      generate a second load voltage based on the first load voltage during the initializing period in response to the transition detection signal being disabled, and
      generate the second load voltage based on the output voltage during the stabilizing period in response to the transition detection signal being enabled.

2. The voltage converter of claim 1, wherein the first load voltage has the first level.

3. The voltage converter of claim 1, wherein a power transformation efficiency of the buck converter is higher than a power transformation efficiency of the high voltage regulator.

4. The voltage converter of claim 1, wherein the dual input linear regulator unit comprises:
   a switching unit configured to select one of the first load voltage and the output voltage in response to the transition detection signal; and
   a first linear regulator connected to the switching unit, the first linear regulator configured to convert the first load voltage to the second load voltage during the initializing period and to convert the output voltage to the second load voltage during the stabilizing period.

5. The voltage converter of claim 4, wherein the switching unit comprises:
a first p-channel metal-oxide semiconductor (PMOS) transistor that is turned on during the initializing period based on the transition detection signal to provide the first load voltage to the first linear regulator; and
a second PMOS transistor that is turned on during the stabilizing period based on the transition detection signal to provide the output voltage to the first linear regulator, the second PMOS transistor connected to the first PMOS transistor at a first node.

6. The voltage converter of claim 5, wherein the first linear regulator comprises:
a driving unit connected to the first node, the driving unit configured to drive a voltage at the first node according to voltage difference between the reference voltage and a feedback voltage; and
a feedback unit connected to the driving unit at a second node, the feedback unit configured to divide the second load voltage at the second node to provide the feedback voltage.

7. The voltage converter of claim 4, further comprising:
a second linear regulator connected to the switching unit, the second linear regulator configured to convert the first load voltage to a third load voltage during the initializing period and to convert the output voltage to the third load voltage during the stabilizing period based on the reference voltage.

8. The voltage converter of claim 7, wherein the second load voltage has a second level lower than the first level, the third load voltage has a third level lower than the second level, and the third level is higher than a ground voltage.

9. The voltage converter of claim 1, wherein the dual input linear regulator unit comprises:
a first converting unit configured to convert the first load voltage to the second load voltage in response to first and second enable signals during the initializing period;
a second converting unit configured to convert the output voltage to the second load voltage in response to third and fourth enable signals during the stabilizing period; and
a control logic configured to generate the first through fourth enable signals in response to the transition detection signal.

10. The voltage converter of claim 9, wherein the first converting unit includes a plurality of first p-channel metal-oxide semiconductor (PMOS) transistors in parallel between a first node and a second node, and the first PMOS transistors are sequentially turned-off in response to the first and second enable signals in response to an operation period transitioning from the initializing period to the stabilizing period, the first load voltage being applied to the first node, the second load voltage being applied the second node.

11. The voltage converter of claim 10, wherein the first converting unit further comprises:
a comparator configured to compare a feedback voltage with the reference voltage, the feedback voltage corresponding to a divided voltage of the second load voltage;
a first switching unit that includes a plurality of first switches, each of the first switches connected to an output of the comparator and each gate of the first PMOS transistors, the first switches configured to be switched in response to the first enable signals; and
a second switching unit that includes a plurality of second switches, each of the second switches connected to the first load voltage, an output of the first switching unit, and each gate of the first PMOS transistors, the second switches configured to be switched in response to the second enable signals.

12. The voltage converter of claim 10, wherein the second converting unit includes a plurality of second PMOS transistors connected in parallel between the second node and a third node, the second PMOS transistors are sequentially turned-off in response to the third and fourth enable signals in response to the operation period transitioning from the initializing period to the stabilizing period, and the output voltage is applied to the third node.

13. The voltage converter of claim 12, wherein the second converting unit further comprises:
a comparator configured to compare a feedback voltage with the reference voltage, the feedback voltage corresponding to a divided voltage of the second load voltage;
a first switching unit that includes a plurality of first switches, each of the first switches connected to an output of the comparator and each gate of the second PMOS transistors, the first switches configured to be switched in response to the third enable signals; and
a second switching unit that includes a plurality of second switches, each of the second switches connected to output voltage, an output of the first switching unit and each gate of the second PMOS transistors, the second switches configured to be switched in response to the fourth enable signals.

14. A wireless power reception device, comprising:
a rectifier configured to rectify an input voltage to provide a rectified voltage, the input voltage generated based on an energy in a target resonator through a magnetic resonance from a source resonator; and
a voltage converter configured to,
convert the rectified voltage to a first load voltage with a first power transformation efficiency during an initializing period, the initializing period being a period in which a target device associated with the voltage converter begins operation,
convert the rectified voltage to at least a second load voltage having a first level with a second power transformation efficiency higher than the first power transformation efficiency during a stabilizing period that succeeds an initializing period, the stabilizing period being a period in which the target device is in stable operation, and
generate a transition detection signal that is configured to be enabled in response to the second load voltage transitioning to the first level.

15. The wireless power reception device of claim 14, wherein the voltage converter comprises:
a high voltage regulator configured to convert the rectified voltage to the first load voltage;
a buck converter configured to,
generate an output voltage having a first level based on the rectified voltage during the stabilizing period, and
generate a transition detection signal that is enabled in response to the output voltage transitioning to the first level; and
a dual input linear regulator unit configured to,
receive the first load voltage, the output voltage, the transition detection signal, and a reference voltage, generate at least the second load voltage based on the first load voltage during the initializing period in response to the transition detection signal being disabled, and generate at least the second load voltage based on the output voltage during the stabilizing period in response to the transition detection signal being enabled.

16. The wireless power reception device of claim 14, further comprising:

a charger configured to charge a battery using the second load voltage during the stabilizing period.

17. A conversion device of a target device for receiving wireless power from a source device, the conversion device comprising:

a first voltage regulator configured to output a first voltage based on a rectified voltage and a reference voltage, the first voltage having a first power conversion efficiency with respect to the rectified voltage;

a voltage converter configured to generate a control signal and a second voltage, the second voltage being based on the first voltage and the rectified voltage, the second voltage having a second power conversion efficiency with respect to the rectified voltage, the second power conversion efficiency being higher than the first power conversion efficiency; and a second voltage regulator configured to output at least a third voltage based on one of the first voltage and the second voltage according to the control signal, the control signal indicating an operation mode of the target device;

wherein the second voltage regulator is further configured to output a fourth voltage based on one of the first voltage and the second voltage according to the control signal.

18. The conversion device of claim 17, further comprising:

a target resonator configured to receive electromagnetic energy from a source resonator of the source device, the rectified voltage being based on the received electromagnetic energy.

19. The conversion device of claim 17, wherein the first voltage is greater than the third voltage, the third voltage is greater than the fourth voltage, and the first voltage is equal the second voltage.

* * * * *